(12) United States Patent
Patel et al.

(10) Patent No.: US 11,488,118 B1
(45) Date of Patent: Nov. 1, 2022

(54) SYSTEM AND METHOD FOR AUDITING OVERAGES AND CONTAMINATION FOR A CUSTOMER WASTE CONTAINER BY A WASTE SERVICES PROVIDER DURING PERFORMANCE OF A WASTE SERVICE ACTIVITY

(71) Applicant: WM INTELLECTUAL PROPERTY HOLDINGS, L.L.C., Houston, TX (US)

(72) Inventors: Kalpesh Patel, Houston, TX (US); Barry S. Skolnick, Reno, NV (US); Shivkumar Vithal, Houston, TX (US); Pamela C. Jansen, Houston, TX (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 17/384,596

(22) Filed: Jul. 23, 2021

Related U.S. Application Data

(60) Provisional application No. 63/161,763, filed on Mar. 16, 2021.

(51) Int. Cl.
| | | |
|---|---|---|
| *G06Q 10/00* | (2012.01) | |
| *G06Q 10/06* | (2012.01) | |
| *G06N 20/00* | (2019.01) | |
| *G06K 9/62* | (2022.01) | |

(Continued)

(52) U.S. Cl.
CPC ........... *G06Q 10/30* (2013.01); *G06K 9/6256* (2013.01); *G06N 20/00* (2019.01); *G06Q 10/0637* (2013.01); *G06Q 10/06315* (2013.01); *G06V 20/41* (2022.01); *G06V 20/64* (2022.01)

(58) Field of Classification Search
CPC ............. G06Q 10/30; G06Q 10/06315; G06Q 10/0637; G06N 20/00; G06V 20/64; G06V 20/41; G06K 9/6256
See application file for complete search history.

(56) References Cited

U.S. PATENT DOCUMENTS

| | | | |
|---|---|---|---|
| 3,202,305 | A | 8/1965 | Herpich |
| 5,072,833 | A | 12/1991 | Hansen et al. |
| 5,230,393 | A | 7/1993 | Mezey |

(Continued)

FOREIGN PATENT DOCUMENTS

| | | |
|---|---|---|
| CA | 2632738 | 5/2016 |
| CA | 2632689 | 10/2016 |

(Continued)

OTHER PUBLICATIONS

US 9,092,921 B2, 07/2015, Lambert et al. (withdrawn)

(Continued)

*Primary Examiner* — Brenda C Bernardi
(74) *Attorney, Agent, or Firm* — Greenberg Traurig LLP

(57) ABSTRACT

Systems and methods are provided for using video/still images captured by continuously recording optical sensors mounted on waste collection vehicles used in in the waste collection, disposal and recycling industry for operational and customer service related purposes. A system is provided for auditing the fill status of a customer waste container by a waste services provider and right sizing the container during performance of a waste service activity.

10 Claims, 19 Drawing Sheets

(51) Int. Cl.
*G06V 20/40* (2022.01)
*G06V 20/64* (2022.01)

(56) References Cited

U.S. PATENT DOCUMENTS

| | | |
|---|---|---|
| 5,245,137 A | 9/1993 | Bowman et al. |
| 5,278,914 A | 1/1994 | Kinoshita et al. |
| 5,489,898 A | 2/1996 | Shigekusa et al. |
| 5,762,461 A | 6/1998 | Frohlingsdorf |
| 5,837,945 A | 11/1998 | Cornwell et al. |
| 6,097,995 A | 8/2000 | Tipton et al. |
| 6,408,261 B1 | 6/2002 | Durbin |
| 6,448,898 B1 | 9/2002 | Kasik |
| 6,510,376 B2 | 1/2003 | Burnstein et al. |
| 6,563,433 B2 | 5/2003 | Fujiwara |
| 6,729,540 B2 | 5/2004 | Ogawa |
| 6,811,030 B1 | 11/2004 | Compton et al. |
| 7,146,294 B1 | 12/2006 | Waitkus, Jr. |
| 7,330,128 B1 | 2/2008 | Lombardo et al. |
| 7,383,195 B2 | 6/2008 | Mallett et al. |
| 7,406,402 B1 | 7/2008 | Waitkus, Jr. |
| 7,501,951 B2 | 3/2009 | Maruca et al. |
| 7,511,611 B2 | 3/2009 | Sabino et al. |
| 7,536,457 B2 | 5/2009 | Miller |
| 7,659,827 B2 | 2/2010 | Gunderson et al. |
| 7,804,426 B2 | 9/2010 | Etcheson |
| 7,817,021 B2 | 10/2010 | Date et al. |
| 7,870,042 B2 | 1/2011 | Maruca et al. |
| 7,878,392 B2 | 2/2011 | Mayers et al. |
| 7,957,937 B2 | 6/2011 | Waitkus, Jr. |
| 7,994,909 B2 | 8/2011 | Maruca et al. |
| 7,999,688 B2 | 8/2011 | Healey et al. |
| 8,020,767 B2 | 9/2011 | Reeves et al. |
| 8,056,817 B2 | 11/2011 | Flood |
| 8,146,798 B2 | 4/2012 | Flood et al. |
| 8,185,277 B2 | 5/2012 | Flood et al. |
| 8,269,617 B2 | 9/2012 | Cook et al. |
| 8,314,708 B2 | 11/2012 | Gunderson et al. |
| 8,330,059 B2 | 12/2012 | Curotto |
| 8,332,247 B1 | 12/2012 | Bailey et al. |
| 8,373,567 B2 | 2/2013 | Denson |
| 8,374,746 B2 | 2/2013 | Plante |
| 8,384,540 B2 | 2/2013 | Reyes et al. |
| 8,485,301 B2 | 7/2013 | Grubaugh et al. |
| 8,508,353 B2 | 8/2013 | Cook et al. |
| 8,542,121 B2 | 9/2013 | Maruca et al. |
| 8,550,252 B2 | 10/2013 | Borowski et al. |
| 8,564,426 B2 | 10/2013 | Cook et al. |
| 8,564,446 B2 | 10/2013 | Gunderson et al. |
| 8,602,298 B2 | 12/2013 | Gonen |
| 8,606,492 B1 | 12/2013 | Botnen |
| 8,630,773 B2 | 1/2014 | Lee et al. |
| 8,645,189 B2 | 2/2014 | Lyle |
| 8,674,243 B2 | 3/2014 | Curotto |
| 8,676,428 B2 | 3/2014 | Richardson et al. |
| 8,714,440 B2 | 5/2014 | Flood et al. |
| 8,738,423 B2 | 5/2014 | Lyle |
| 8,744,642 B2 | 6/2014 | Nemat-Nasser et al. |
| 8,803,695 B2 | 8/2014 | Denson |
| 8,818,908 B2 | 8/2014 | Altice et al. |
| 8,849,501 B2 | 9/2014 | Cook et al. |
| 8,854,199 B2 | 10/2014 | Cook et al. |
| 8,862,495 B2 | 10/2014 | Ritter |
| 8,880,279 B2 | 11/2014 | Plante |
| 8,930,072 B1 | 1/2015 | Lambert et al. |
| 8,952,819 B2 | 2/2015 | Nemat-Nasser |
| 8,970,703 B1 | 3/2015 | Thomas, II et al. |
| 8,996,234 B1 | 3/2015 | Tamari et al. |
| 9,047,721 B1 | 6/2015 | Botnen |
| 9,058,706 B1 | 6/2015 | Cheng |
| 9,098,884 B2 | 8/2015 | Borowski et al. |
| 9,098,956 B2 | 8/2015 | Lambert et al. |
| 9,111,453 B1 | 8/2015 | Alselimi |
| 9,158,962 B1 | 10/2015 | Nemat-Nasser et al. |
| 9,180,887 B2 | 11/2015 | Nemat-Nasser et al. |
| 9,189,899 B2 | 11/2015 | Cook et al. |
| 9,226,004 B1 | 12/2015 | Plante |
| 9,235,750 B1 | 1/2016 | Sutton et al. |
| 9,238,467 B1 | 1/2016 | Hoye et al. |
| 9,240,079 B2 | 1/2016 | Lambert et al. |
| 9,240,080 B2 | 1/2016 | Lambert et al. |
| 9,245,391 B2 | 1/2016 | Cook et al. |
| 9,247,040 B1 | 1/2016 | Sutton |
| 9,251,388 B2 | 2/2016 | Flood |
| 9,268,741 B1 | 2/2016 | Lambert et al. |
| 9,275,090 B2 | 3/2016 | Denson |
| 9,280,857 B2 | 3/2016 | Lambert et al. |
| 9,292,980 B2 | 3/2016 | Cook et al. |
| 9,298,575 B2 | 3/2016 | Tamari et al. |
| 9,317,980 B2 | 4/2016 | Cook et al. |
| 9,330,287 B2 | 5/2016 | Graczyk et al. |
| 9,341,487 B2 | 5/2016 | Bonhomme |
| 9,342,884 B2 | 5/2016 | Mask |
| 9,344,683 B1 | 5/2016 | Nemat-Nasser et al. |
| 9,347,818 B2 | 5/2016 | Curotto |
| 9,358,926 B2 | 6/2016 | Lambert et al. |
| 9,373,257 B2 | 6/2016 | Bonhomme |
| 9,389,147 B1 | 7/2016 | Lambert et al. |
| 9,390,568 B2 | 7/2016 | Nemat-Nasser et al. |
| 9,396,453 B2 | 7/2016 | Hynes et al. |
| 9,401,985 B2 | 7/2016 | Sutton |
| 9,403,278 B1 | 8/2016 | Van Kampen et al. |
| 9,405,992 B2 | 8/2016 | Badholm et al. |
| 9,418,488 B1 | 8/2016 | Lambert |
| 9,428,195 B1 | 8/2016 | Surpi |
| 9,442,194 B2 | 9/2016 | Kurihara et al. |
| 9,463,110 B2 | 10/2016 | Nishtala et al. |
| 9,466,212 B1 | 10/2016 | Stumphauzer, II et al. |
| 9,472,083 B2 | 10/2016 | Nemat-Nasser |
| 9,495,811 B2 | 11/2016 | Herron |
| 9,501,690 B2 | 11/2016 | Nemat-Nasser et al. |
| 9,520,046 B2 | 12/2016 | Call et al. |
| 9,525,967 B2 | 12/2016 | Mamlyuk |
| 9,546,040 B2 | 1/2017 | Flood et al. |
| 9,573,601 B2 | 2/2017 | Hoye et al. |
| 9,574,892 B2 | 2/2017 | Rodoni |
| 9,586,756 B2 | 3/2017 | O'Riordan et al. |
| 9,589,393 B2 | 3/2017 | Botnen |
| 9,594,725 B1 | 3/2017 | Cook et al. |
| 9,595,191 B1 | 3/2017 | Surpi |
| 9,597,997 B2 | 3/2017 | Mitsuta et al. |
| 9,604,648 B2 | 3/2017 | Tamari et al. |
| 9,633,318 B2 | 4/2017 | Plante |
| 9,633,576 B2 | 4/2017 | Reed |
| 9,639,535 B1 | 5/2017 | Ripley |
| 9,646,651 B1 | 5/2017 | Richardson |
| 9,650,051 B2 | 5/2017 | Hoye et al. |
| 9,679,210 B2 | 6/2017 | Sutton et al. |
| 9,685,098 B1 | 6/2017 | Kypri |
| 9,688,282 B2 | 6/2017 | Cook et al. |
| 9,702,113 B2 | 7/2017 | Kotaki et al. |
| 9,707,595 B2 | 7/2017 | Ripley |
| 9,721,342 B2 | 8/2017 | Mask |
| 9,734,717 B1 | 8/2017 | Surpi et al. |
| 9,754,382 B1 | 9/2017 | Rodoni |
| 9,766,086 B1 | 9/2017 | Rodoni |
| 9,778,058 B2 | 10/2017 | Rodoni |
| 9,803,994 B1 | 10/2017 | Rodoni |
| 9,824,336 B2 | 11/2017 | Borges et al. |
| 9,824,337 B1 | 11/2017 | Rodoni |
| 9,834,375 B2 | 12/2017 | Jenkins et al. |
| 9,852,405 B1 | 12/2017 | Rodoni et al. |
| 10,029,685 B1 | 7/2018 | Hubbard et al. |
| 10,152,737 B2 | 12/2018 | Lyman |
| 10,198,718 B2 | 2/2019 | Rodoni |
| 10,210,623 B2 | 2/2019 | Rodoni |
| 10,255,577 B1 | 4/2019 | Steves et al. |
| 10,311,501 B1 | 6/2019 | Rodoni |
| 10,332,197 B2 | 6/2019 | Kekalainen et al. |
| 10,354,232 B2 | 7/2019 | Tomlin, Jr. et al. |
| 10,382,915 B2 | 8/2019 | Rodoni |
| 10,410,183 B2 | 9/2019 | Bostick et al. |
| 10,594,991 B1 | 3/2020 | Skolnick |
| 10,750,134 B1 | 8/2020 | Skolnick |

(56) References Cited

U.S. PATENT DOCUMENTS

| | | |
|---|---|---|
| 10,855,958 B1 | 12/2020 | Skolnick |
| 10,911,726 B1 | 2/2021 | Skolnick |
| 11,074,557 B2 | 7/2021 | Flood |
| 11,128,841 B1 | 9/2021 | Skolnick |
| 11,140,367 B1 | 10/2021 | Skolnick |
| 11,172,171 B1 | 11/2021 | Skolnick |
| 11,222,491 B2 | 1/2022 | Romano et al. |
| 11,373,536 B1 | 6/2022 | Savchenko |
| 11,386,362 B1 | 7/2022 | Kim |
| 11,425,340 B1 | 8/2022 | Skolnick |
| 2002/0069097 A1 | 6/2002 | Conrath |
| 2002/0077875 A1 | 6/2002 | Nadir |
| 2002/0125315 A1 | 9/2002 | Ogawa |
| 2002/0194144 A1 | 12/2002 | Berry |
| 2003/0014334 A1 | 1/2003 | Tsukamoto |
| 2003/0031543 A1 | 2/2003 | Elbrink |
| 2003/0069745 A1 | 4/2003 | Zenko |
| 2003/0191658 A1 | 10/2003 | Rajewski |
| 2003/0233261 A1 | 12/2003 | Kawahara et al. |
| 2004/0039595 A1 | 2/2004 | Berry |
| 2004/0167799 A1 | 8/2004 | Berry |
| 2005/0038572 A1 | 2/2005 | Krupowicz |
| 2005/0080520 A1 | 4/2005 | Kline et al. |
| 2005/0182643 A1 | 8/2005 | Shirvanian |
| 2005/0209825 A1 | 11/2005 | Ogawa |
| 2005/0261917 A1 | 11/2005 | Forget Shield |
| 2006/0235808 A1 | 10/2006 | Berry |
| 2007/0150138 A1 | 6/2007 | Plante |
| 2007/0260466 A1 | 11/2007 | Casella et al. |
| 2007/0278140 A1 | 12/2007 | Mallett et al. |
| 2008/0010197 A1 | 1/2008 | Scherer |
| 2008/0077541 A1 | 3/2008 | Scherer et al. |
| 2008/0202357 A1 | 8/2008 | Flood |
| 2008/0234889 A1 | 9/2008 | Sorensen |
| 2009/0014363 A1 | 1/2009 | Gonen et al. |
| 2009/0024479 A1 | 1/2009 | Gonen et al. |
| 2009/0055239 A1 | 2/2009 | Waitkus, Jr. |
| 2009/0083090 A1 | 3/2009 | Rolfes et al. |
| 2009/0126473 A1 | 5/2009 | Porat et al. |
| 2009/0138358 A1 | 5/2009 | Gonen et al. |
| 2009/0157255 A1 | 6/2009 | Plante |
| 2009/0161907 A1 | 6/2009 | Healey et al. |
| 2010/0017276 A1 | 1/2010 | Wolff et al. |
| 2010/0071572 A1 | 3/2010 | Carroll et al. |
| 2010/0119341 A1 | 5/2010 | Flood et al. |
| 2010/0175556 A1 | 7/2010 | Kummer et al. |
| 2010/0185506 A1 | 7/2010 | Wolff et al. |
| 2010/0217715 A1 | 8/2010 | Lipcon |
| 2010/0312601 A1 | 12/2010 | Lin |
| 2011/0108620 A1 | 5/2011 | Wadden et al. |
| 2011/0137776 A1 | 6/2011 | Goad et al. |
| 2011/0208429 A1 | 8/2011 | Zheng et al. |
| 2011/0225098 A1 | 9/2011 | Wolff et al. |
| 2011/0260878 A1 | 10/2011 | Rigling |
| 2011/0279245 A1 | 11/2011 | Hynes et al. |
| 2011/0316689 A1 | 12/2011 | Reyes et al. |
| 2012/0029980 A1 | 2/2012 | Paz et al. |
| 2012/0029985 A1 | 2/2012 | Wilson et al. |
| 2012/0047080 A1 | 2/2012 | Rodatos |
| 2012/0262568 A1 | 10/2012 | Ruthenberg |
| 2012/0265589 A1 | 10/2012 | Whittier |
| 2012/0310691 A1 | 12/2012 | Carlsson et al. |
| 2013/0024335 A1 | 1/2013 | Lok |
| 2013/0039728 A1 | 2/2013 | Price et al. |
| 2013/0041832 A1 | 2/2013 | Rodatos |
| 2013/0075468 A1 | 3/2013 | Wadden et al. |
| 2013/0332238 A1 | 12/2013 | Lyle |
| 2013/0332247 A1 | 12/2013 | Gu |
| 2014/0060939 A1 | 3/2014 | Eppert |
| 2014/0112673 A1 | 4/2014 | Sayama |
| 2014/0114868 A1 | 4/2014 | Wan et al. |
| 2014/0172174 A1 | 6/2014 | Poss et al. |
| 2014/0214697 A1 | 7/2014 | McSweeney |
| 2014/0236446 A1 | 8/2014 | Spence |
| 2014/0278630 A1 | 9/2014 | Gates et al. |
| 2014/0379588 A1 | 12/2014 | Gates et al. |
| 2015/0095103 A1 | 4/2015 | Rajamani et al. |
| 2015/0100428 A1 | 4/2015 | Parkinson, Jr. |
| 2015/0144012 A1 | 5/2015 | Frybarger |
| 2015/0278759 A1 | 10/2015 | Harris et al. |
| 2015/0294431 A1 | 10/2015 | Fiorucci et al. |
| 2015/0298903 A1 | 10/2015 | Luxford |
| 2015/0302364 A1 | 10/2015 | Calzada et al. |
| 2015/0307273 A1 | 10/2015 | Lyman |
| 2015/0324760 A1 | 11/2015 | Borowski et al. |
| 2015/0326829 A1 | 11/2015 | Kurihara et al. |
| 2015/0348252 A1 | 12/2015 | Mask |
| 2015/0350610 A1 | 12/2015 | Loh |
| 2016/0021287 A1 | 1/2016 | Loh |
| 2016/0044285 A1 | 2/2016 | Gasca et al. |
| 2016/0179065 A1 | 6/2016 | Shahabdeen |
| 2016/0187188 A1 | 6/2016 | Curotto |
| 2016/0224846 A1 | 8/2016 | Cardno |
| 2016/0232498 A1 | 8/2016 | Tomlin, Jr. et al. |
| 2016/0239689 A1 | 8/2016 | Flood |
| 2016/0247058 A1 | 8/2016 | Kreiner et al. |
| 2016/0292653 A1 | 10/2016 | Gonen |
| 2016/0300297 A1 | 10/2016 | Kekalainen et al. |
| 2016/0321619 A1 | 11/2016 | Inan et al. |
| 2016/0334236 A1 | 11/2016 | Mason et al. |
| 2016/0335814 A1 | 11/2016 | Tamari et al. |
| 2016/0372225 A1 | 12/2016 | Lefkowitz et al. |
| 2016/0377445 A1 | 12/2016 | Rodoni |
| 2016/0379152 A1 | 12/2016 | Rodoni |
| 2016/0379154 A1 | 12/2016 | Rodoni |
| 2017/0008671 A1 | 1/2017 | Whitman et al. |
| 2017/0011363 A1 | 1/2017 | Whitman et al. |
| 2017/0029209 A1 | 2/2017 | Smith et al. |
| 2017/0046528 A1 | 2/2017 | Lambert |
| 2017/0061222 A1 | 3/2017 | Hoye et al. |
| 2017/0076249 A1 | 3/2017 | Byron et al. |
| 2017/0081120 A1 | 3/2017 | Liu et al. |
| 2017/0086230 A1 | 3/2017 | Azevedo et al. |
| 2017/0109704 A1 | 4/2017 | Lettieri et al. |
| 2017/0116583 A1 | 4/2017 | Rodoni |
| 2017/0116668 A1 | 4/2017 | Rodoni |
| 2017/0118609 A1 | 4/2017 | Rodoni |
| 2017/0121107 A1 | 5/2017 | Flood et al. |
| 2017/0124533 A1 | 5/2017 | Rodoni |
| 2017/0154287 A1 | 6/2017 | Kalinowski et al. |
| 2017/0176986 A1 | 6/2017 | High et al. |
| 2017/0193798 A1 | 7/2017 | Call et al. |
| 2017/0200333 A1 | 7/2017 | Plante |
| 2017/0203706 A1 | 7/2017 | Reed |
| 2017/0221017 A1 | 8/2017 | Gonen |
| 2017/0243269 A1 | 8/2017 | Rodini et al. |
| 2017/0243363 A1 | 8/2017 | Rodini |
| 2017/0277726 A1 | 9/2017 | Huang et al. |
| 2017/0308871 A1 | 10/2017 | Tallis |
| 2017/0330134 A1 | 11/2017 | Botea et al. |
| 2017/0344959 A1 | 11/2017 | Bostick et al. |
| 2017/0345169 A1 | 11/2017 | Rodoni |
| 2017/0350716 A1 | 12/2017 | Rodoni |
| 2017/0355522 A1 | 12/2017 | Salinas et al. |
| 2017/0364872 A1 | 12/2017 | Rodoni |
| 2018/0012172 A1 | 1/2018 | Rodoni |
| 2018/0025329 A1 | 1/2018 | Podgorny et al. |
| 2018/0075417 A1 | 3/2018 | Gordon et al. |
| 2018/0158033 A1 | 6/2018 | Woods et al. |
| 2018/0194305 A1 | 7/2018 | Reed |
| 2018/0245940 A1 | 8/2018 | Dong et al. |
| 2018/0247351 A1 | 8/2018 | Rodoni |
| 2019/0005466 A1 | 1/2019 | Rodoni |
| 2019/0019167 A1 | 1/2019 | Candel et al. |
| 2019/0050879 A1 | 2/2019 | Zhang et al. |
| 2019/0056416 A1 | 2/2019 | Rodoni |
| 2019/0065901 A1 | 2/2019 | Amato et al. |
| 2019/0196965 A1 | 6/2019 | Zhang et al. |
| 2019/0197498 A1 | 6/2019 | Gates et al. |
| 2019/0210798 A1 | 7/2019 | Schultz |
| 2019/0217342 A1 | 7/2019 | Parr et al. |
| 2019/0244267 A1 | 8/2019 | Rattner et al. |
| 2019/0311333 A1 | 10/2019 | Kekalainen et al. |
| 2020/0082167 A1* | 3/2020 | Shalom .................... G06N 3/08 |

(56) References Cited

U.S. PATENT DOCUMENTS

| | | | |
|---|---|---|---|
| 2020/0109963 | A1 | 4/2020 | Zass |
| 2020/0175556 | A1 | 6/2020 | Podgorny |
| 2020/0191580 | A1* | 6/2020 | Christensen ............ G01F 23/28 |
| 2021/0188541 | A1* | 6/2021 | Kurani ................. B09B 3/0075 |
| 2021/0217156 | A1* | 7/2021 | Balachandran ........ G06N 20/10 |

FOREIGN PATENT DOCUMENTS

| | | |
|---|---|---|
| CN | 101482742 | 7/2009 |
| CN | 101512720 | 8/2009 |
| CN | 105787850 | 7/2016 |
| CN | 105929778 | 9/2016 |
| CN | 106296416 | 1/2017 |
| DE | 69305435 | 4/1997 |
| DE | 69902531 | 4/2003 |
| DE | 102012006536 | 10/2013 |
| EP | 577540 | 10/1996 |
| EP | 1084069 | 8/2002 |
| EP | 2028138 | 2/2009 |
| GB | 2447184 | 9/2008 |
| JP | 3662616 | 6/2005 |
| JP | 2012-206817 | 10/2012 |
| JP | 2013-142037 | 7/2013 |
| WO | 99/54237 | 10/1999 |
| WO | 2007/067772 | 6/2007 |
| WO | 2007/067775 | 6/2007 |
| WO | 2012/069839 | 5/2012 |
| WO | 2012/172395 | 12/2012 |
| WO | 2016/074608 | 5/2016 |
| WO | 2016/187677 | 12/2016 |
| WO | 2017/070228 | 4/2017 |
| WO | 2017/179038 | 10/2017 |
| WO | 2018/182858 | 10/2018 |
| WO | 2018/206766 | 11/2018 |
| WO | 2018/215682 | 11/2018 |

OTHER PUBLICATIONS

Nilopherjan, N. et al.; Automatic Garbage Volume Estimation Using SIFT Features Through Deep Neural Networks and Poisson Surface Reconstruction; International Journal of Pure and Applied Mathematics; vol. 119, No. 14; 2015; pp. 1101-1107.

Ghongane, Aishwarya et al; Automatic Garbage Tracking and Collection System; International Journal of Advanced Technology in Engineering and Science; vol. 5, No. 4; Apr. 2017; pp. 166-173.

Rajani et al.; Waste Management System Based on Location Intelligence; 4 pages; Poojya Doddappa Appa Colleage of Engineering, Kalaburgi.

Waste Management Review; A clear vison on waste collections; Dec. 8, 2015; 5 pages; http://wastemanagementreiew.com/au/a-clear-vison-on-waste-collections/.

Waste Management Surveillance Solutiosn; Vehicle Video Cameral; Aug. 23, 2017; 6 pages; http://vehiclevideocameras.com/mobile-video-applications/waste-management-camera.html.

Rich, John I.; Truck Equipment: Creating a Safer Waste Truck Environment; Sep. 2013; pp. 18-20 WasteAdvantage Magainze.

Town of Prosper; News Release: Solid Waste Collection Trucks Equipped wit "Third Eye," video system aborad trash and recycling trucks to improve service; Jan. 13, 2017; 1 page; U.S.

Product News Network; Telematics/Live Video System Increases Driver Safety/Productivity; Mar. 30, 2015; 3 pages; Thomas Industrial Network, Inc.

Karidis, Arlene; Waste Pro to Install Hight-Tech Camera Systems in all Trucks to Address Driver Safety; Mar. 10, 2016; 2 pages; Wastedive com.

Greenwalt, Megan; Finnish Company Uses IoT to Digitize Trash Bins; Sep. 14, 2016; 21 pages; www.waste360.com.

Georgakopoulos, Chris; Cameras Cut Recycling Contamination; The Daily Telegraph; Apr. 7, 2014; 2 pages.

Van Dongen, Matthew; Garbage 'Gotcha' Videos on Rise in City: Residents Irked Over Perceived Infractions; Nov. 18, 2015; 3 pages; The Spectator.

The Advertiser; Waste Service Drives Innovation; Jan. 25, 2016; 2 pages; Fairfax Media Publications Pty Limited; Australia.

RWP-Wasteportal.com; Waste & Recycling Data Portal and Software; 16 pages; printed Oct. 3, 2019.

Bhargava, Hermant K. et al.; A Web-Based Decision Support System for Waste Disposal and Recycling; pp. 47-65; 1997; Comput. Environ. And Urban Systems, vol. 21, No. 1; Pergamon.

Kontokasta, Constantine E. et al.; Using Machine Learning and Small Area Estimation to Predict Building-Level Municipal Solid Waste Generation in Cities; pp. 151-162; 2018; Computer, Envieonment and Urban Systems Elsevier.

Ferrer, Javier et al.; BIN-CT: Urban Waste Collection Based on Predicting the Container Fill Level; Apr. 23, 2019; 11 pages; Elsevier.

Vu, Hoang Lan et al.; Waste Management: Assessment of Waste Characteristics and Their Impact on GIS Vechicle Collection Route Optimization Using ANN Waste Forecasts; Environmental Systems Engineering; Mar. 22, 2019; 13 pages; Elsevier.

Hina, Syeda Mahlaqa; Municipal Solid Waste Collection Route Optimization Using Geospatial Techniques: A Case Study of Two Metropolitan Cities of Pakistan; Feb. 2016; 205 pages; U.S.

Kannangara, Miyuru et al.; Waste Management: Modeling and Prediction of Regional Municipal Soid Waste Generation and Diversion in Canada Using Machine Learning Approaches; Nov. 30, 2017; 3 pages; Elsevier.

Tan, Kah Chun et al.; Smart Land: AI Waste Sorting System; University of Malaya; 2 pages; Keysight Techonogies.

Oliveira, Veronica et al.; Journal of Cleaner Production: Artificial Neural Network Modelling of the Amount of Separately-Collected Household Packaging Waste; Nov. 8, 2018; 9 pages; Elsevier.

Zade, Jalili Ghazi et al.; Prediction of Municipal Solid Waste Generation by Use of Artificial Neural Network: A Case Study of Mashhad; Winter 2008; 10 pages; Int. J. Environ. Res., 2(1).

Sein, Myint Myint et al.; Trip Planning Query Based on Partial Sequenced Route Algorithm; 2019 IEEE 8th Global Conference; pp. 778-779.

A.F., Thompson et al.; Application of Geographic Information System to Solid Waste Management; Pan African Internatonal Conference on Information Science, Computing and Telecommunications; 2013; pp. 206-211.

Malakahmad, Amirhossein et al.; Solid Waste Collection System in Ipoh City, A Review; 2011 International Conference on Business, Engineering and Industrial Applications; pp. 174-179.

* cited by examiner

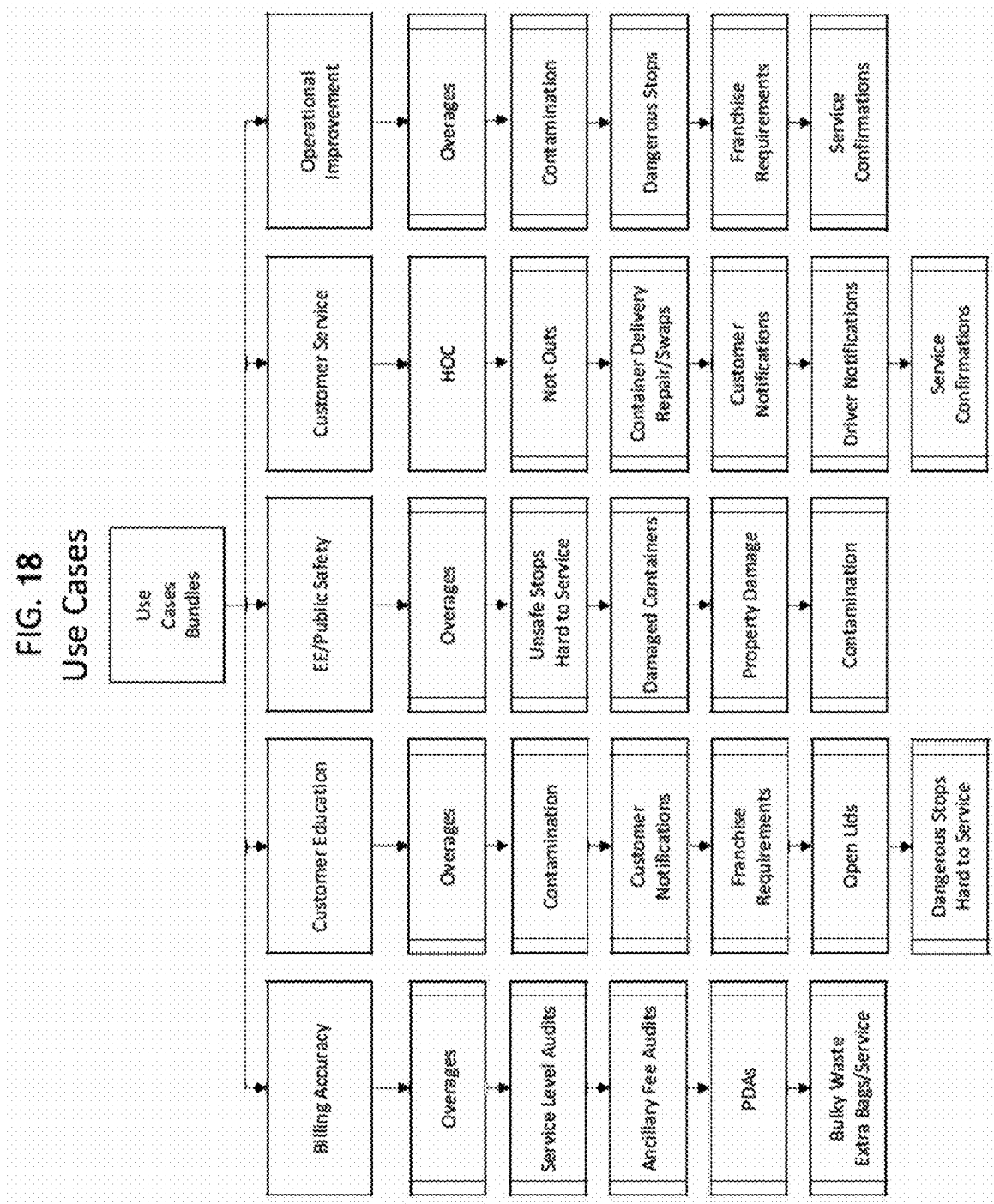

SYSTEM AND METHOD FOR AUDITING OVERAGES AND CONTAMINATION FOR A CUSTOMER WASTE CONTAINER BY A WASTE SERVICES PROVIDER DURING PERFORMANCE OF A WASTE SERVICE ACTIVITY

RELATED APPLICATIONS

This application claims the benefit, and priority benefit, of U.S. Provisional Patent Application Ser. No. 63/161,763, filed Mar. 16, 2021, the disclosure and contents of which are incorporated by reference herein in their entirety.

BACKGROUND

1. Field of the Invention

The presently disclosed subject matter relates to waste management, and more particularly, to a waste management system for auditing a fill status and/or contamination status of a customer waste container by a waste services provider during performance of a waste service activity.

2. Description of the Related Art

Waste service vehicles and waste container delivery vehicles used in the waste collection, disposal and recycling industry often have on-board computers, location devices and interior and exterior safety and non-safety related cameras installed on the exterior and interior thereof. These systems can provide waste services providers and their field managers with information related to the waste service vehicle, location of the waste service vehicle, waste service confirmation, customer service issues, service routing issues, customer site information and safety issues and concerns.

Common concerns for waste services providers are overloaded and/or contaminated customer containers. Containers with trash or recyclables protruding from the top or sides (i.e., overloaded) can result in scattered contents and possible injury or accidents. Containers with trash or recyclables that are hazardous and/or not of the designated type that belongs in the container (i.e., contaminated) can create safety issues and/or can require additional sorting which adds to processing costs. Waste services providers have sought improved means for identifying the fill status of the container and addressing and/or preventing overloaded or contaminated containers. Waste services providers have also sought improved means for auditing the status of customer waste containers, including but not limited to the container fill status and/or contamination status, during performance of a waste service activity.

Prior auditing means were typically performed visually by the driver or other employees at the site of the customer waste container, and were often inefficient and/or provided inaccurate results.

Improvements in this field of technology are desired.

SUMMARY

Various illustrative embodiments of a system for right sizing a customer waste container during performance of a waste service activity by a waste services provider are provided herein. In certain illustrative embodiments, the system can include an optical sensor disposed on a waste collection vehicle and configured to capture image data of the customer waste container that is indicative of the fill status of the container; a memory storage area, and a processor in communication with the memory storage area and configured to: receive the image data from the optical sensor; compare the fill status from the image data of the customer waste container to a predetermined overload threshold condition for an exemplary customer waste container stored in the memory storage area, wherein the processor is trained, using machine learning functionality, to recognize and identify the fill status of the customer waste container based on the image data received from the optical sensor; determine, based on the comparison, whether the fill status of the customer waste container has met or exceeded the predetermined overload threshold condition; score and rank the results of the comparison; display the results on an electronic viewing portal; make the electronic viewing portal available for viewing by a user; receive instructions from the user regarding whether to deliver a different sized container to a customer, based on a review by the user of the scoring and ranking of the results; and execute a communication to the customer advising of the delivery of the different sized container. The processor can also receive instructions from the user as to which results from the comparison have been accurately scored and ranked and communicate the instructions to the machine learning functionality for training purposes. The display of results on the electronic viewing portal can include a link to video of the image data and a plurality of still images from the image data with a designation of which still image displays the most overloaded container.

Various illustrative embodiments of a method of right sizing a customer waste container at a customer location by a waste service provider are also provided herein. In certain illustrative embodiments, the method can include: capturing image data of the customer waste container that is indicative of the fill status of the container, wherein the image data is captured using an optical sensor located on a waste collection vehicle; comparing the fill status from the image data of the customer waste container to a predetermined overload threshold condition for an exemplary customer waste container stored in the memory storage area, wherein the processor is trained, using machine learning, to recognize and identify the fill status of the customer waste container based on the image data received from the optical sensor; determining, based on the comparison, whether the fill status of the customer waste container has met or exceeded the predetermined overload threshold condition; scoring and ranking the results of the comparison; displaying the results on an electronic viewing portal; making the electronic viewing portal available for viewing by a user; receiving instructions from the user regarding whether to deliver a different sized container to the customer, based on a review of the scoring and ranking of the results by the user; and executing a communication to the customer advising of the delivery of the different sized container. The method can also include receiving instructions from the user as to which results from the comparison have been accurately scored and ranked; and communicating the instructions to the machine learning functionality for training purposes. The displaying of results on the electronic viewing portal can include a link to video of the image data and a plurality of still images from the image data with a designation of which still image displays the most overloaded container.

BRIEF DESCRIPTION OF THE DRAWINGS

A better understanding of the presently disclosed subject matter can be obtained when the following detailed description is considered in conjunction with the drawings and figures herein, wherein:

FIG. 18 is an illustration of various examples of use case bundles in accordance with an illustrative embodiment of the presently disclosed subject matter.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates to systems and methods for auditing the status of a customer waste container by a waste services provider using video/still images captured by one or more optical sensors mounted on a waste collection vehicle used in the waste collection, disposal and recycling industry. The presently disclosed systems and methods are directed to overcoming the issues and problems of the prior art.

Figure 1:
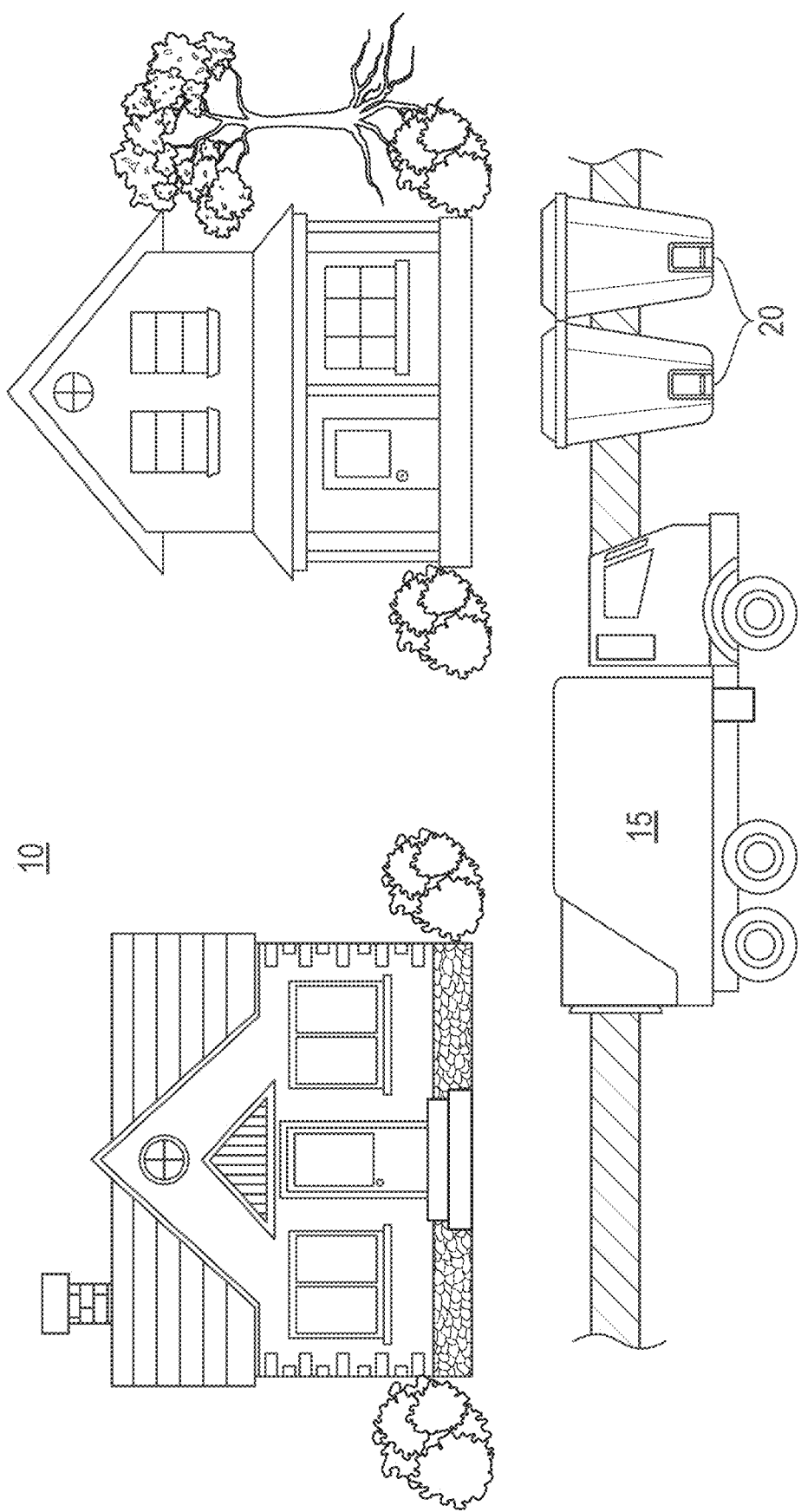
FIG. 1 is a representative example of a waste services environment where a waste service vehicle is configured to capture images from vehicle mounted optical sensors of customer waste containers and other service related and non-service related activity outside of the waste service vehicle in accordance with an illustrative embodiment of the presently disclosed subject matter.

FIG. 1 is an example of a waste services environment 10 where the presently disclosed system and method can be utilized. A waste service vehicle 15 is configured to provide services to customers, which can include typical lines of waste industry services such as waste collection and transport and/or recycling for commercial, residential and/or industrial. Waste service vehicle 15 collects waste or recyclables from a plurality of containers 20 which will typically be assigned to, or associated with, specific customers registered to a waste collection company.

Figure 2:
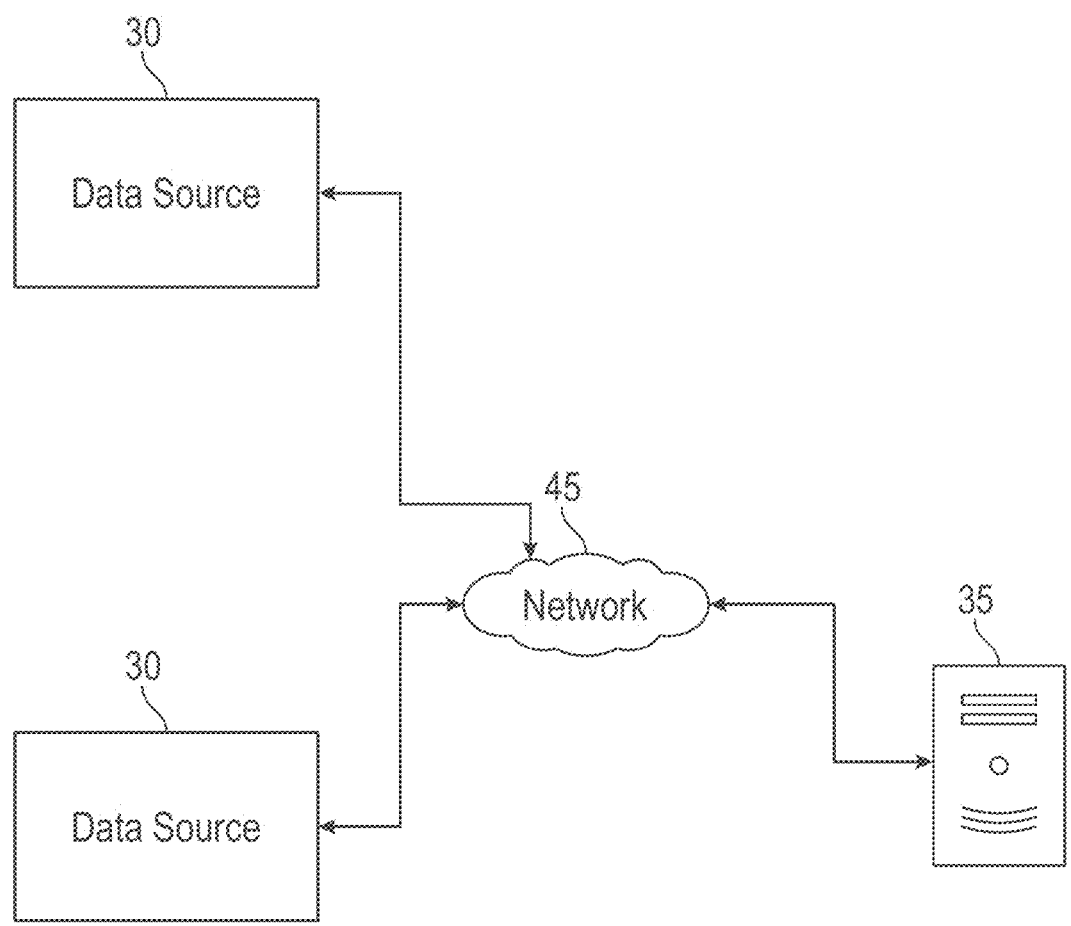
FIG. 2 is a system for auditing a status of a customer waste container by a waste services provider during performance of a waste service activity in the environment of FIG. 1, in accordance with an illustrative embodiment of the presently disclosed subject matter.

FIG. 2 illustrates a high-level overview of a system and network according to various illustrative embodiments herein. The components and general architecture of the system and network may be adapted for use in the specific waste services environment of FIG. 1. The system can include one or more data sources 30 and a central server 35. Data sources 30 may be, for example, devices configured for capturing and communicating operational data indicative of one or more operational characteristics (e.g., one or more optical sensors 40 on waste service vehicle 15 capturing video or still images of containers 20). Data sources 30 are configured to communicate with central server 35 by sending and receiving operational data over a network 45 (e.g., the Internet, an Intranet, or other suitable network). Central server 35 may be configured to process and evaluate operational data received from data sources 30 in accordance with user input received via a user interface provided on a local or remote computer.

Figure 3A:
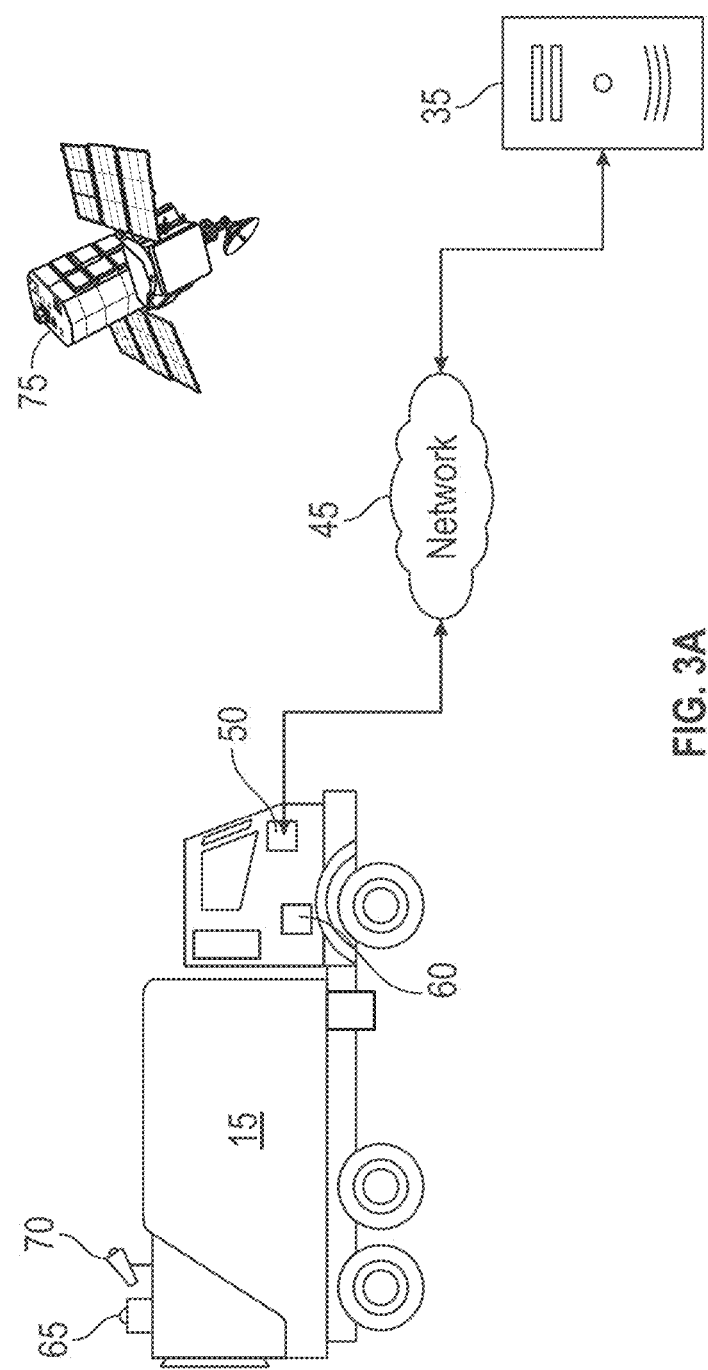
FIG. 3A is an example of a communications network in accordance with an illustrative embodiment of the presently disclosed subject matter.
Figure 3B:
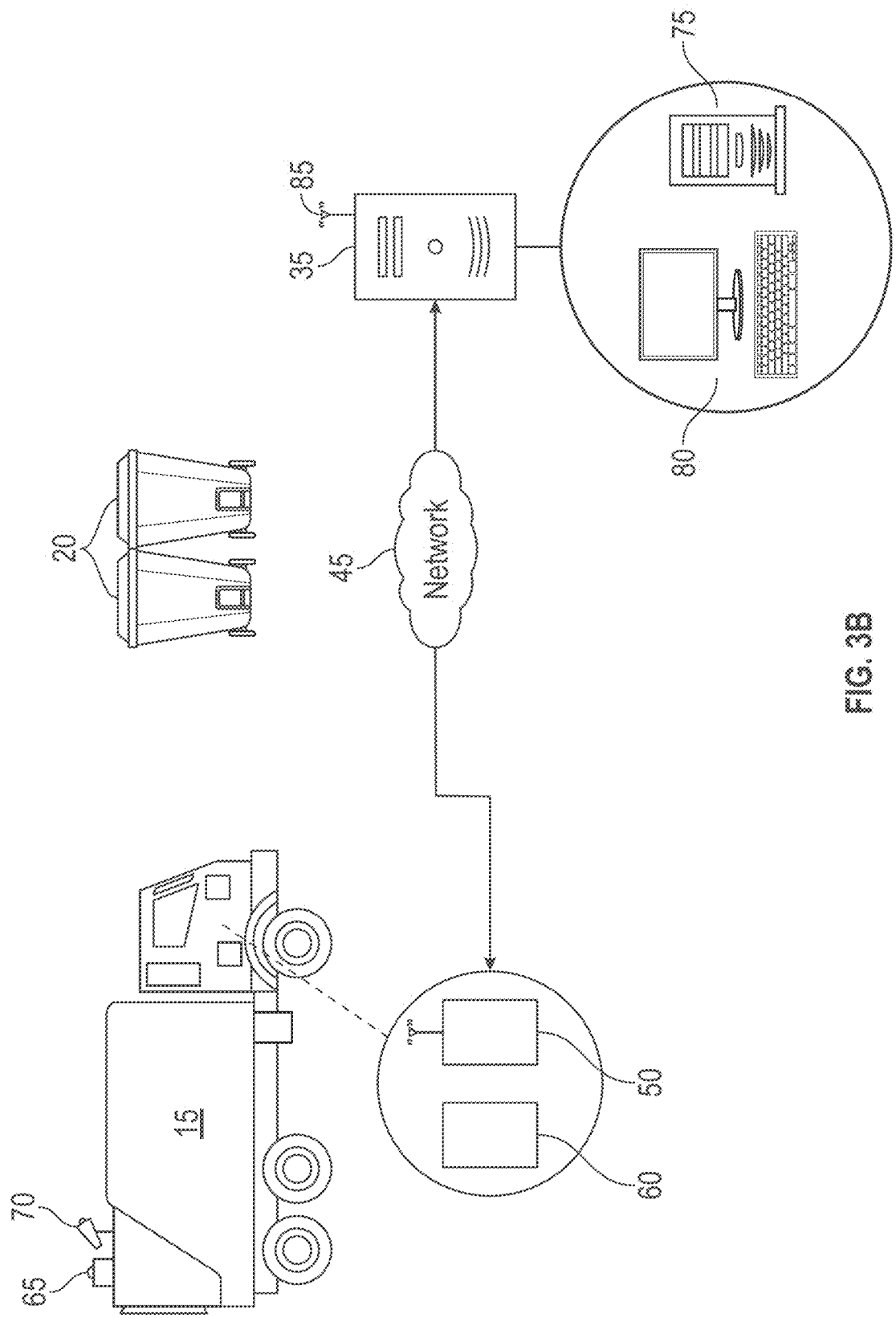
FIG. 3B is an example of a communications network for a waste services vehicle in accordance with an illustrative embodiment of the presently disclosed subject matter.
Figure 4:
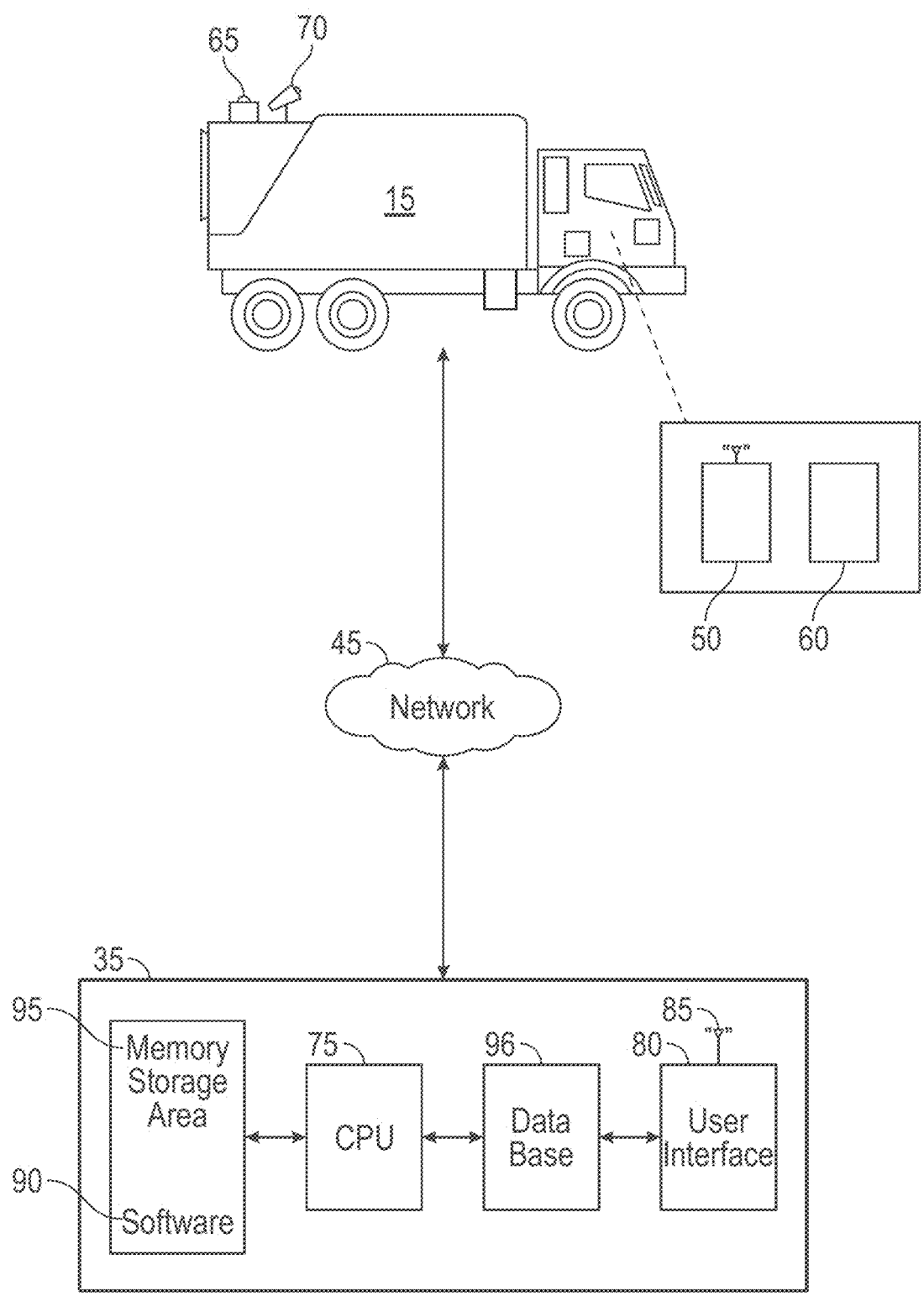
FIG. 4 is an example of a computing system in accordance with an illustrative embodiment of the presently disclosed subject matter.

In the illustrative embodiment shown in FIGS. 3A, 3B and 4, a system and network are shown wherein a communications device 50 can be disposed on waste service vehicle 15. Communications device 50 and central server 35 are configured to communicate with each other via a communications network 45 (e.g., the Internet, an Intranet, a cellular network, or other suitable network). In addition, communications device 50 and central server 35 are configured for storing data to an accessible central server database 96 located on, or remotely from, central server 35. In the description provided herein, the system may be configured for managing and evaluating the operation of a large fleet of waste service vehicles 15. As such, in certain illustrative embodiments, the system may further comprise a plurality of communications devices 50, each being associated with one of a plurality of waste service vehicles 15.

In certain illustrative embodiments, the communication between communications device 50 provided on-board waste service vehicle 15 and central server 35 may be provided on a real time basis such that during the collection route, data is transmitted from each waste service vehicle 15 to central server 35. Alternatively, communication device 50 may be configured to temporarily store or cache data during the collection route and transfer the data to the central server 35 on return of waste service vehicle 15 to the location of the waste collection company.

In certain illustrative embodiments, as illustrated in FIG. 3B, waste service vehicle 15 can also include an onboard computer 60, a location device 65, and an optical sensor 70. Onboard computer 60 can be, for example, a standard desktop or laptop personal computer ("PC"), or a computing apparatus that is physically integrated with vehicle 15, and can include and/or utilize various standard interfaces that can be used to communicate with location device 65 and optical sensor 70. Onboard computer 60 can also communicate with central server 35 via a communications network 45 via communication device 50.

Location device 65 can be configured to determine the location of waste service vehicle 15 always while waste service vehicle 15 is inactive, in motion and operating and performing service related and nonservice related activities. For example, location device 65 can be a GPS device that can communicate with the waste collection company. A satellite 75 or other communications device can be utilized to facilitate communications. For example, location device 65 can transmit location information, such as digital latitude and longitude, to onboard computer 60 via satellite 75. Thus, location device 65 can identify the location of waste service vehicle 15, and therefore the location of the customer site where container 20 is located, after vehicle 15 has arrived at the customer site.

In certain illustrative embodiments, optical sensor 70 can be configured to capture still or video images of containers 20 as well as other service related and non-service related activity outside of the waste service vehicle 15. Optical sensor 70 can be, for example, a video camera. Optical sensor 70 can be disposed on waste collection vehicle 15 and configured to capture image data of customer waste container 20 that is indicative of the fill status and/or contamination status of container 20. The images collected by optical sensor 70 may be transmitted to and stored by onboard computer 60, and/or delivered to central server 35.

For example, in certain illustrative embodiments one or more optical sensors 70 can be installed throughout the waste collection vehicle 15 including, but not limited to, high definition cameras, monitors and such other sensors mounted to the front (interior and exterior of the cab), exterior right side, exterior left side, exterior rear and exterior/interior hopper area of the service vehicle. Optical sensor 70 can periodically or continuously record, or record upon demand, desired activities outside the vehicle 15. The recorded images and data can be stored on onboard computer 60 using a recording device (such as a digital video recorder) and be also be transmitted and stored remotely away from waste service vehicle 15 or in the "cloud" via cellular and/or other wireless transmissions and/or communicate vis network 45. The images can be available for review in immediate real-time or passive review later by an end-user.

In the illustrative embodiment of FIG. 4, a exemplary computer system and associated communication network is shown. In certain illustrative embodiments, central server 35 can be configured to receive and store operational data (e.g., data received from waste services vehicle 15) and evaluate the data to aid waste services company in improving operational efficiency. Central server 35 can include various means for performing one or more functions in accordance with embodiments of the present invention, including those more particularly shown and described herein; however, central server 35 may include alternative devices for performing one or more like functions without departing from the spirit and scope of the present invention.

In certain illustrative embodiments, central server 35 can include standard components such as processor 75 and user interface 80 for inputting and displaying data, such as a keyboard and mouse or a touch screen, associated with a standard laptop or desktop computer. Central server 35 also includes a communication device 85 for wireless communication with onboard computer 60.

Central server 35 may include software 90 that communicates with one or more memory storage areas 95. Memory storage areas 95 can be, for example, multiple data repositories which stores pre-recorded data pertaining to a plurality of customer accounts. Such information may include customer location, route data, items expected to be removed from the customer site, and/or billing data. For example, using the location (e.g., street address, city, state, and zip code) of a customer site, software 90 may find the corresponding customer account in memory storage areas 95. Database 96 for data storage can be in memory storage area 95 and/or supplementary external storage devices as are well known in the art.

While a "central server" is described herein, a person of ordinary skill in the art will recognize that embodiments of the present invention are not limited to a client-server architecture and that the server need not be centralized or limited to a single server, or similar network entity or mainframe computer system. Rather, the server and computing system described herein may refer to any combination of devices or entities adapted to perform the computing and networking functions, operations, and/or processes described herein without departing from the spirit and scope of embodiments of the present invention.

In certain illustrative embodiments, a system is provided for auditing the fill status and/or contamination status of a customer waste container 20 by a waste services provider during performance of a waste service activity. Optical sensor 70 is disposed on waste collection vehicle 15 and configured to capture image data of customer container 20 that is indicative of the fill status and/or contamination status of container 20. Central server 35 may utilize memory storage area 95, and processor 75 in communication with memory storage area 95 to, in real time during performance of the waste service activity, receive the image data from optical sensor 70, compare the fill status and/or contamination status from the image data to a predetermined overload threshold condition (or "POTC") for customer container 20 stored in memory storage area 95, and determine, based on the comparison, whether the fill status and/or contamination status has met or exceeded the predetermined overload threshold condition. If the fill status and/or contamination status has met or surpassed the predetermined overload threshold condition, an action proposal can be generated, from which one or more actions can be executed. The actions can comprise, for example, one or more of: (i) a customer communication, (ii) a customer billing adjustment, and (iii) a container recovery instruction for customer container 20 for collection and delivery to waste collection vehicle 15 and either container replacement or removal from the customer site.

The presently disclosed waste management system can allow a waste service provider to audit the status of a customer waste container 20 during performance of a waste service activity. In certain illustrative embodiments, the system and method disclosed herein can also be utilized to perform "audits" in industries other than the waste industry, where auditing of containers using optical sensors and associated computer functionality are utilized. In certain illustrative embodiments, the presently disclosed waste management system involves delivering waste services to a customer and/or tracking service delivery progress/status/completion using improvements to proprietary systems such as described in U.S. Pat. No. 10,594,991 issued Mar. 17, 2020, and assigned to WM Intellectual Property Holdings LLC and titled "System and method for managing service and non-service related activities associated with a waste collection, disposal and/or recycling vehicle," the contents of which are incorporated by reference herein in their entirety.

In certain illustrative embodiments, software 90 can execute the flow of the method steps of FIGS. 5-8 interacting with the various system elements of FIGS. 1-4. In the illustrative embodiment shown in FIG. 5, the method can be initiated when an image or video of a customer container is received from an optical sensor on a waste service vehicle (Step 501). The location of the waste service vehicle can then be identified (Step 502), and can be associated with a customer identity in the database based on stored customer information such as address (Step 503). Once the customer identity is established, a determination can be made of whether the fill status and/or contamination status of the customer waste container in the image or video meets or exceeds the predetermined overload threshold condition ("POTC") for that particular customer (Step 504). If the answer is yes, an action proposal for the customer can be generated (Step 505). If desired, user input can be utilized to analyze the action proposal, and amend as necessary. For example, the user can pick one or more of these options from the action proposal for execution. One or more actions can then be executed from the action proposal (Step 506).

Figure 5:
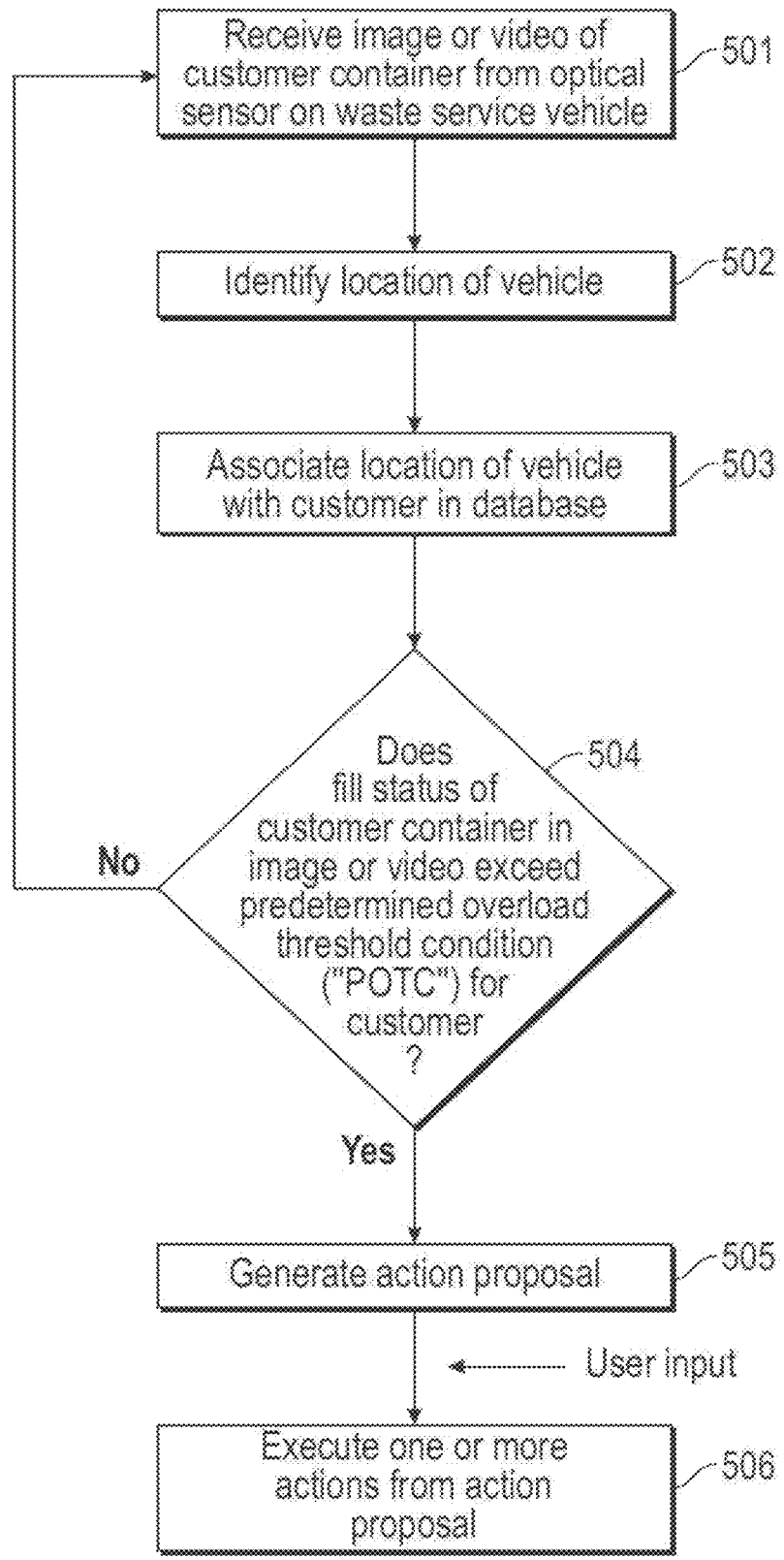
FIG. 5 is a flowchart for auditing the container fill status and/or contamination status of a customer waste container during performance of a waste service activity in accordance with an illustrative embodiment of the presently disclosed subject matter.
Figure 6:
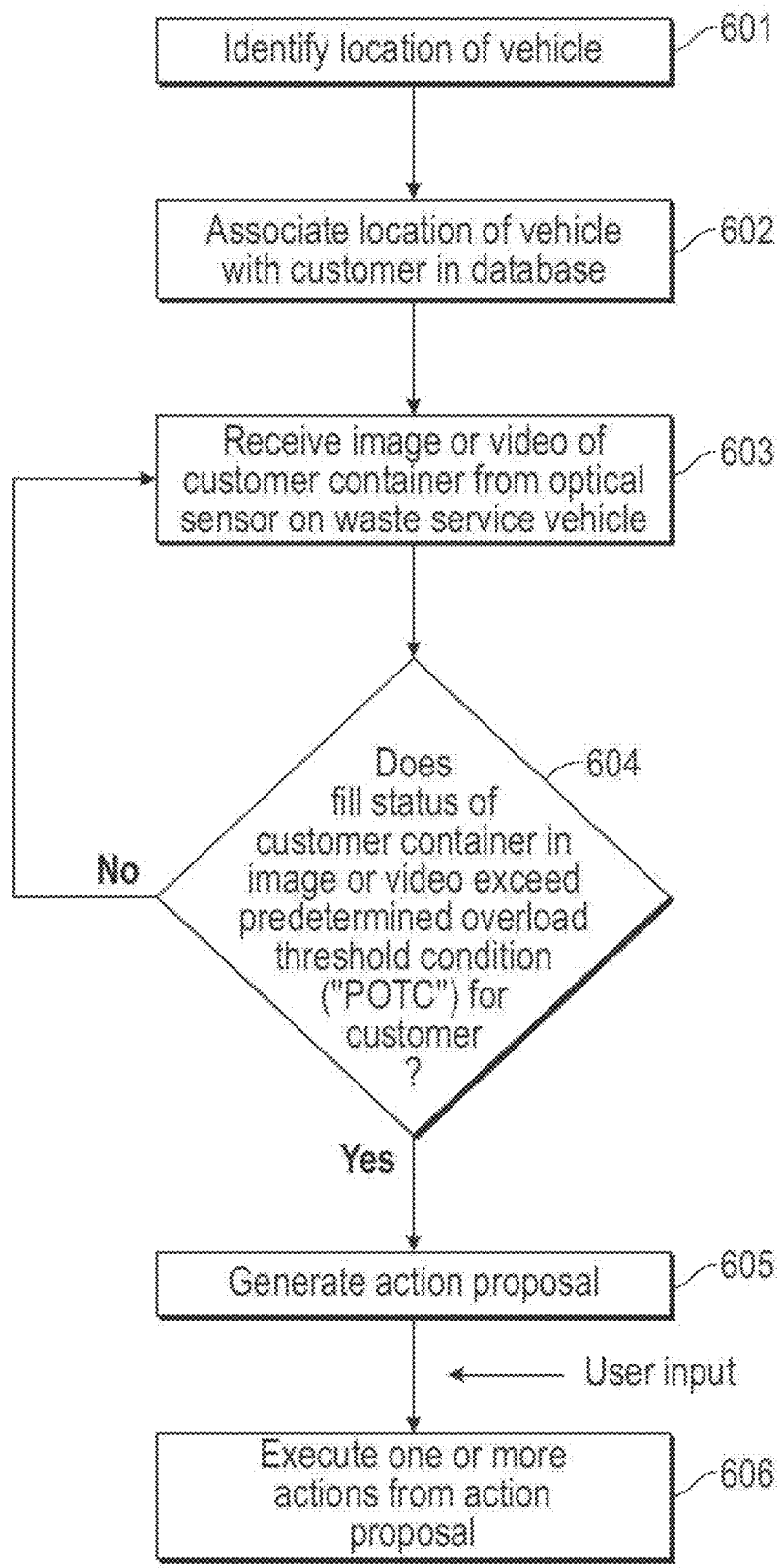
FIG. 6 is a flowchart for auditing the container fill status and/or contamination status of a customer waste container during performance of a waste service activity in accordance with an illustrative embodiment of the presently disclosed subject matter.

In the illustrative embodiment shown in FIG. 6, the method can be initiated when the location of the waste service vehicle is identified (Step 601). The location of the waste service vehicle can then be associated with a customer identity in the database based on stored customer information such as address (Step 602). An image or video of a customer container can be received from an optical sensor on a waste service vehicle (Step 603), and a determination can be made of whether the fill status and/or contamination status of the customer waste container in the image or video meets or exceeds the predetermined overload threshold condition ("POTC") for that particular customer (Step 604). If the answer is yes, an action proposal for the customer can be generated (Step 605). If desired, user input can be utilized to analyze the action proposal, and amend as necessary. For example, the user can pick one or more of these options from the action proposal for execution. One or more actions can then be executed from the action proposal (Step 606). The illustrative embodiment shown in FIG. 6 differs from that shown in FIG. 5 in that the identification of the location of the vehicle and the identity of the associated customer is performed before, instead of after, the image is received from the waste service vehicle.

Figure 7:
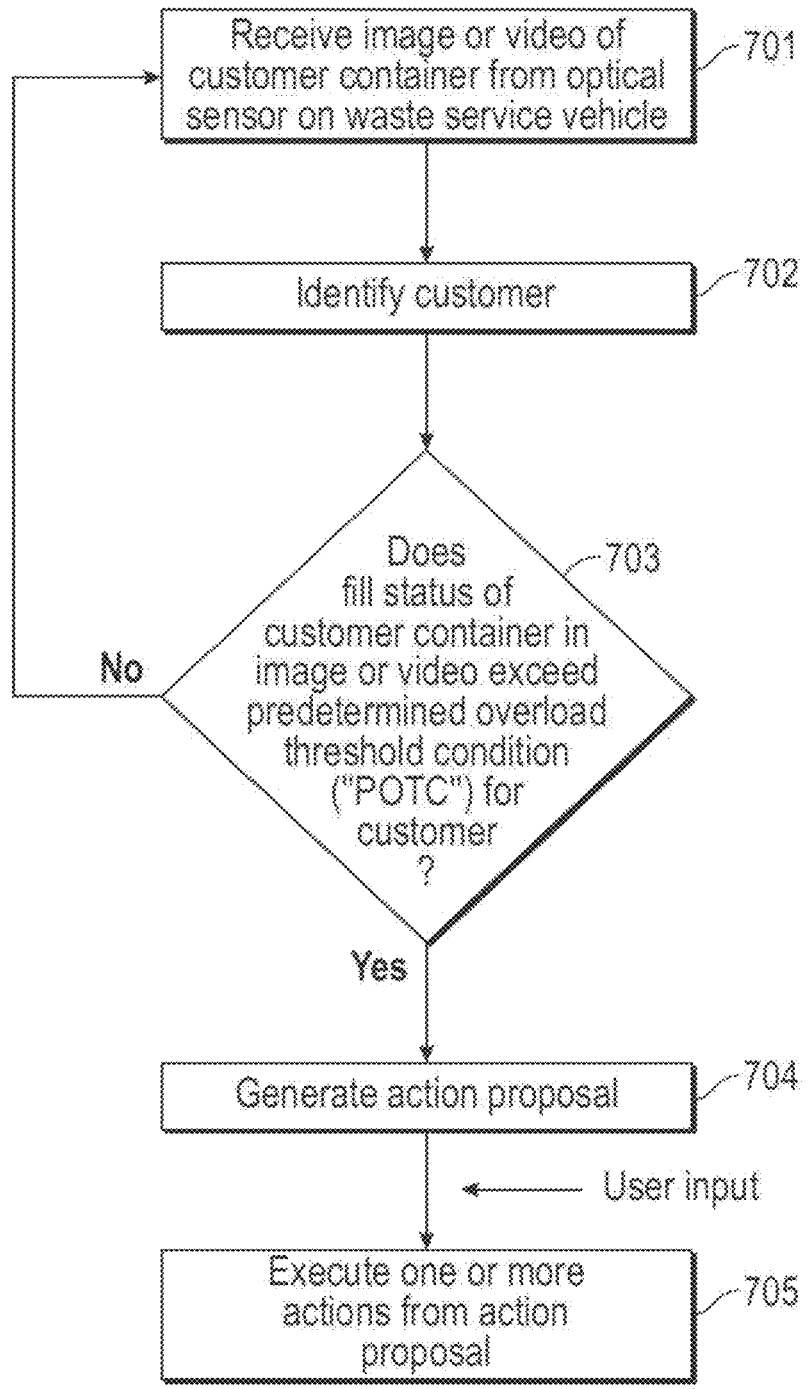
FIG. 7 is a flowchart for auditing the container fill status and/or contamination status of a customer waste container during performance of a waste service activity in accordance with an illustrative embodiment of the presently disclosed subject matter.

In the illustrative embodiment shown in FIG. 7, the method can be initiated when an image or video of a customer container is received from an optical sensor on a waste service vehicle (Step 701). The customer can then be identified (Step 702), and associated with stored customer information in the database (Step 703). Next, a determination can be made of whether the fill status and/or contamination status of the customer waste container in the image or video meets or exceeds the predetermined overload threshold condition ("POTC") for that particular customer (Step 704). If the answer is yes, an action proposal for the customer can be generated (Step 705). User input can be utilized to analyze the action proposal, and amend as necessary. For example, the user can pick one or more of these options from the action proposal for execution. One or more actions can then be executed from the action proposal (Step 706). The illustrative embodiment shown in FIG. 7 differs from that shown in FIG. 6 in that no location identifying is utilized to identify the customer. For example, the customer identify may already be known, or obtainable, via other means.

Figure 8:
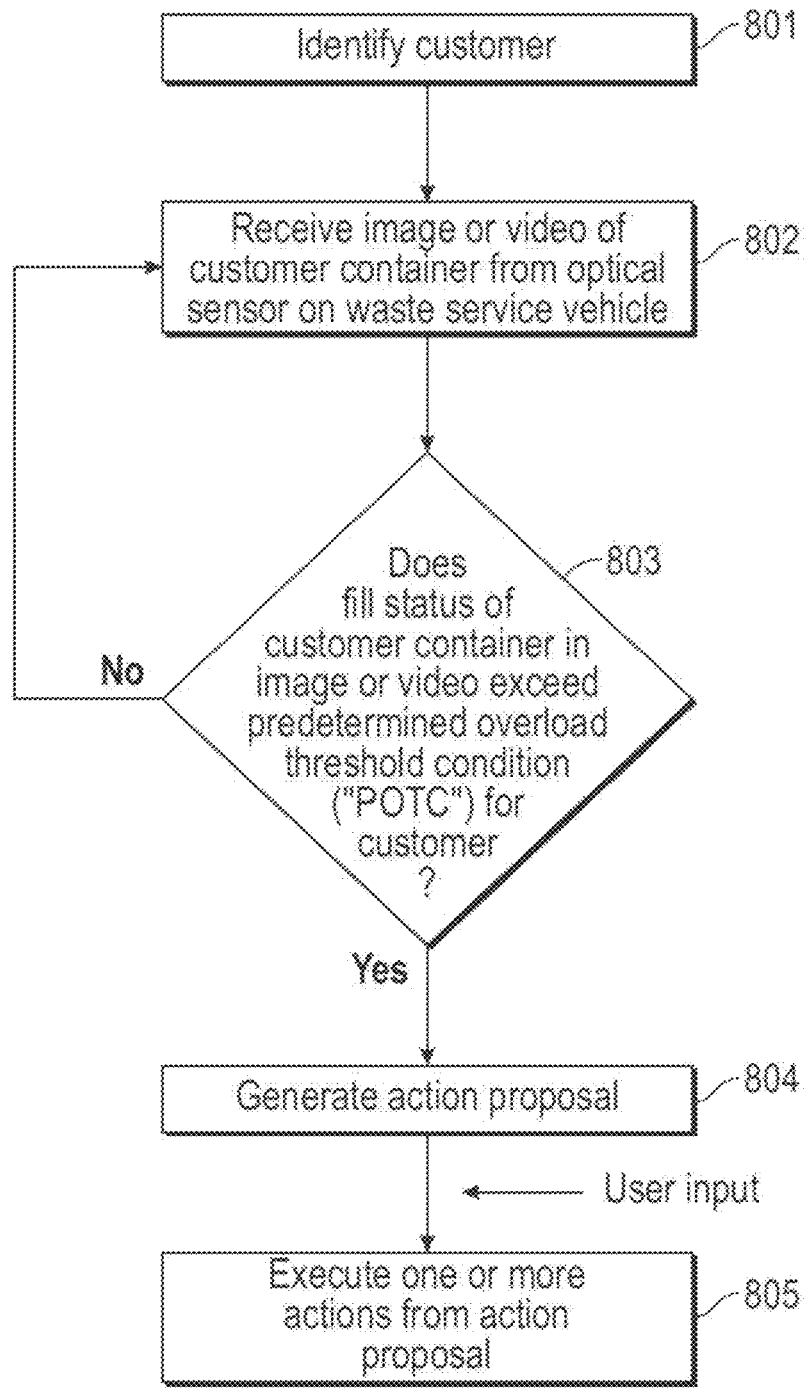
FIG. 8 is a flowchart for auditing the container fill status and/or contamination status of a customer waste container during performance of a waste service activity in accordance with an illustrative embodiment of the presently disclosed subject matter.

In the illustrative embodiment shown in FIG. 8, the method can be initiated when the customer is identified (Step 801), and associated with stored customer information in the database. Next, an image or video of a customer container is received from an optical sensor on a waste service vehicle (Step 802). A determination can be made of whether the fill status and/or contamination status of the customer waste container in the image or video meets or exceeds the predetermined overload threshold condition ("POTC") for that particular customer (Step 803). If the answer is yes, an action proposal for the customer can be generated (Step 804). User input can be utilized to analyze the action proposal, and amend as necessary. For example, the user can pick one or more of these options from the action proposal for execution. One or more actions can then be executed from the action proposal (Step 805). The illustrative embodiment shown in FIG. 8 differs from that shown in FIG. 7 in that the identity of the associated customer is performed before, instead of after, the image is received from the waste service vehicle.

Figure 9:
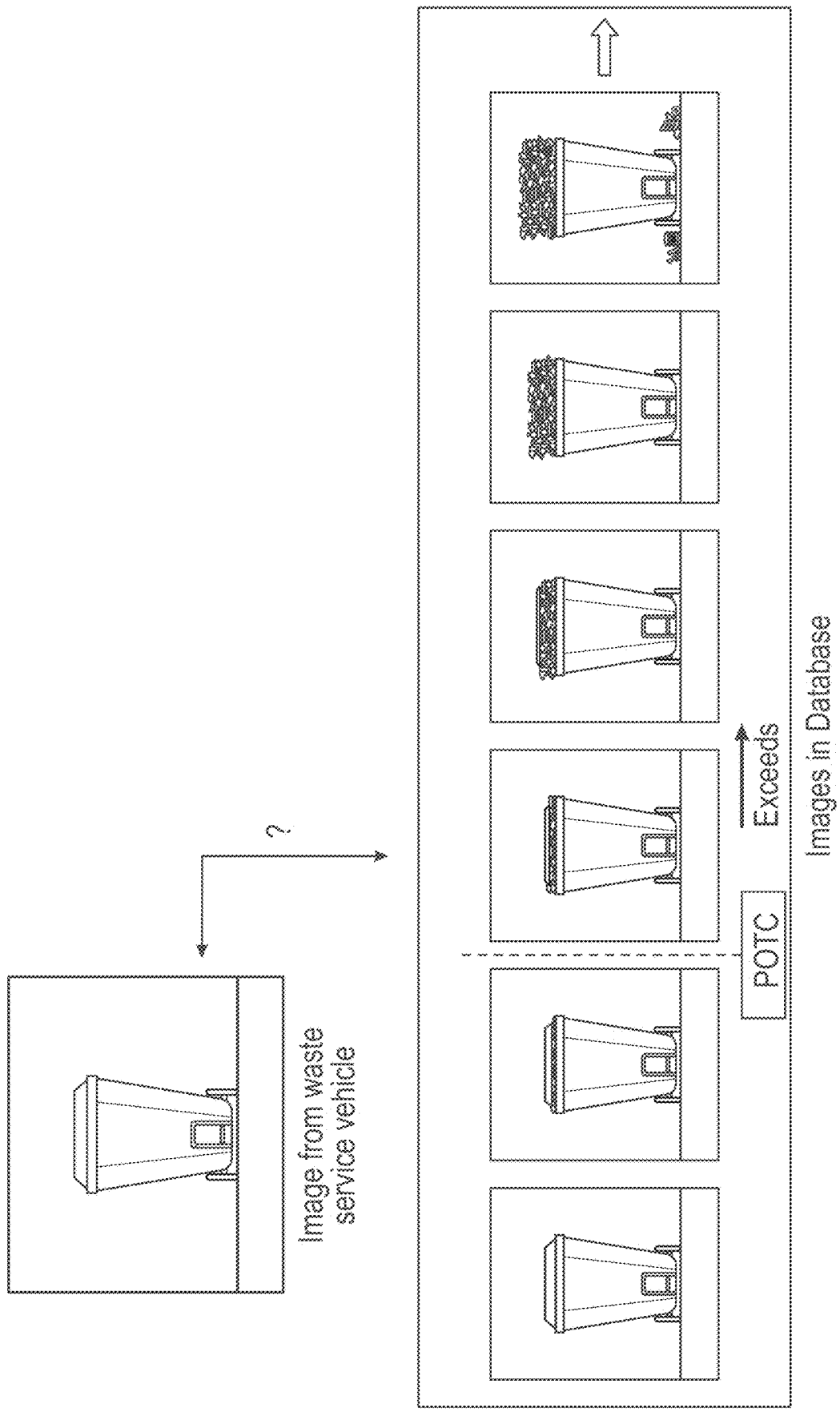
FIG. 9 is an illustration of a fill status and/or contamination status from image data being compared to a predetermined overload threshold condition for a customer waste container in accordance with an illustrative embodiment of the presently disclosed subject matter.

In certain illustrative embodiments, and as illustrated in FIG. 9, the image(s) captured and stored by optical sensor 70 and communicated to central server 35 may be compared (e.g., by processor 75) with the pictures and/or descriptions stored in memory storage area 95 to determine if any objects in the image(s) match any particular picture and/or description, and thus meet or exceed predetermined overload threshold condition ("POTC"). FIG. 9 represents an overall depiction of how the determination could occur, in certain illustrative embodiments. In some cases, the images can be displayed on a video screen with graphical user interface for viewing and interaction by a user, such that the user can participate in making the determination.

In certain illustrative embodiments, the POTC can be customer specific. Alternatively, the POTC does not need to be associated with any particular customer, and can instead be a standard condition established by the waste service provider based on any number of conditions and requirements. If desired, a user of the system can double check or confirm the determination of "overloaded" or "contaminated" status made by the processor by soliciting a visual confirmation from the driver onsite.

In certain illustrative embodiments, processor 75 may automatically review the accumulated images and determine whether predetermined overload threshold condition ("POTC") is met or exceeded based on machine learning and in association with programmed recognition patterns. In particular, processor 75 may be taught to recognize, for example, patterns of shapes, or sizes, that indicate trash protruding from the top or sides of container 20 or representing a contaminated status, based on existing images in the database. Object recognition software may also be used for this purpose. In the flowchart of FIG. 5, for example, if no objects within the image match the picture and/or description of the sought-after items when Step 504 is performed, control may return to Step 501. However, when one or more objects recognized in the image captured by optical sensor 70 substantially match (e.g., within a threshold margin) the picture and/or description received at Step 501, then an action proposal will be generated at Step 505.

In certain illustrative embodiments, the comparing and determining are performed using machine learning based on a set of programmed data associated with the predetermined overload threshold condition for the exemplary customer waste container. The set of programmed data can include a plurality of images of the exemplary customer waste container. Each image of the exemplary customer waste container can display a different exemplary fill status and/or contamination status condition, where a first subsection of the plurality of images is pre-identified, based on the exemplary fill status and/or contamination status condition, as meeting or exceeding the predetermined overload threshold condition, and where a second subsection of the plurality of images is pre-identified, based on the exemplary fill status and/or contamination status condition, as not meeting or exceeding the predetermined overload threshold condition. The pre-identification of an image in the set of programmed data as meeting or exceeding, or not meeting or exceeding, the predetermined overload threshold condition can be based upon one or more features in the image such as an open or closed status of the lid of the exemplary customer waste container, a presence or absence of waste on the ground adjacent the exemplary customer waste container, or an identification of excess waste in a defined region above the rim of the exemplary customer waste container when the lid of the exemplary customer waste container is at least partially open. The processor can be trained, using machine learning or via programming, to recognize and identify the fill status and/or contamination status of the customer waste container based on the image data received from the optical sensor. The recognition and identifying of the fill status and/or contamination status of the customer waste container can also be based upon one or more features in the image data such an open or closed status of the lid of the customer waste container, a presence or absence of waste on the ground adjacent the customer waste container, and an identification of excess waste in a defined region above the rim of the customer waste container when the lid of the customer waste container is at least partially open. The processor can be trained, using machine learning, to match the recognized fill status and/or contamination status of the customer waste container with the image of the exemplary customer waste container in the set of programmed data that has a corresponding fill status and/or contamination status, and then to categorize the fill status and/or contamination status of the customer waste container as either (i) meeting or exceeding, or (ii) not meeting or exceeding, the predetermined overload threshold condition.

In certain illustrative embodiments, one or more action proposals can be generated based on the identifications above. The actions proposals can include, for example, recommendations to (i) remove excess waste from customer container, (ii) remove and replace container, (iii) provide additional containers, (iv) provide reporting, education and/or instructions to customer, or (v) to adjust customer billing. In addition, historical account information and attributes of target customer and "like" customers can be collected, and the action proposals for target customers can be determined and ranked based on lifetime value impact scoring. Additional information can also be collected from the Internet or other outside sources. Scoring of target customer can be impacted based on prior proposals or interactions as well as preferences/acceptances of "like" customers to similar action proposals, and restrictions or constraints from target customer's attributes can be applied. Action proposals can be delivered to appropriate user/system for acceptance, and thereupon, the action proposal can be executed/applied, which can include charging the customer for the overage, notifying the customer of the overage through a proactive warning and notification process (including still images and/or video), and noting the overage incident on the customer's account.

In certain illustrative embodiments, a method is provided for collecting, processing, and applying data from a waste service vehicle to increase customer lifetime value through targeted action proposals. The method can include the steps of: collecting information (such as image, video, collection vehicle, driver inputs) at a target service location; matching customer account to a target service location; processing information from the target service location and historical customer account record to create an action proposal; and executing an action from the action proposal. The information that can be processed can include a variety of gathered information, for example, information regarding safety, receptacle condition, receptacle contents, fill status and/or contamination status, site conditions, obstructions (temporary or permanent), service, service quality (verification, receptacle identification, receptacle contents), service audit (size, frequency, location, and quantity), service exceptions (unable to service, site obstructions), site damage, theft/poaching/no customer, sustainability, material diversion/audits, dangerous/hazardous materials, savings, site service times, bin locations and ancillary services (locks, gates, etc).

In certain illustrative embodiments, auditors can perform auditing of overages and contamination according to the presently disclosed systems and methods using a vehicle auditor media review portal 1000. Machine learning workflows can also be utilized to augment the analysis performed by the auditors. In certain illustrative embodiments, machine learning workflows can process commercial and/or residential overage and contamination events. An object detection model can support the overage and contamination workflows with contamination using an additional classification layer. Object detection can be utilized to identify objects of certain classes in an image, interpreting these images and make predictions. Capture of potentially millions of images and videos is possible using optical sensors, however, relevant metadata to help facilitate the creation of training datasets for machine learning can be limited. In certain illustrative embodiments, data can be curated and labeled for these specific purposes.

An illustrative embodiments of portal 1000 is shown in FIGS. 10-17 herein. Portal 1000 is a landing page for frontline auditors to review all of the media events associated with a vehicle and accept, for example, only those chargeable events. Auditors can have the ability to search events by overloaded and/or contamination. Each media event can include, for example, a photo or video image along with related information such as time and date, ID or customer number, location information (e.g., site name and/or address), container type, waste type, etc.

Figure 10:
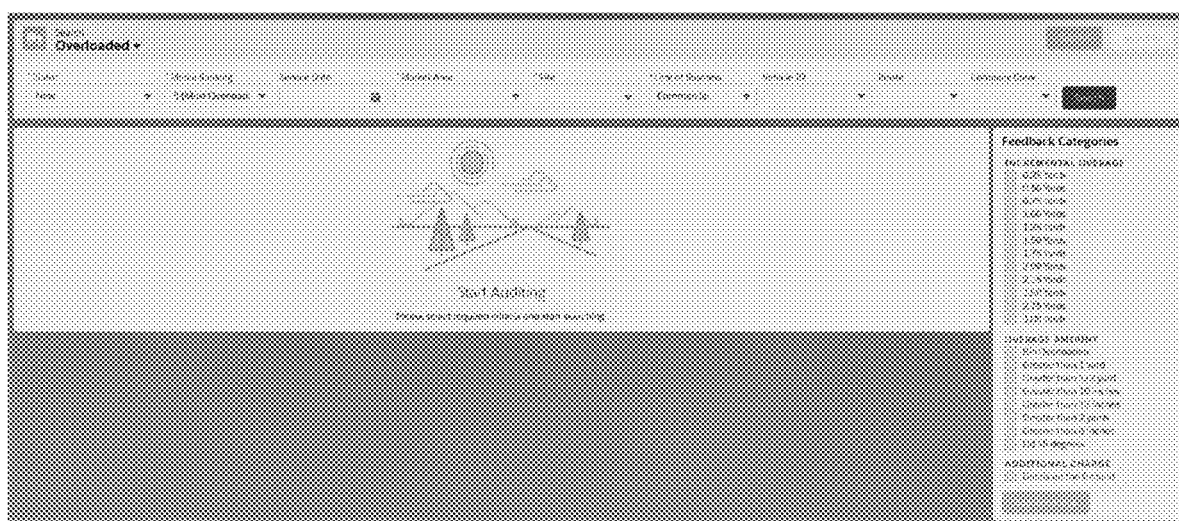
FIG. 10 is an illustration of an auditing portal configured for overloaded analysis in accordance with an illustrative embodiment of the presently disclosed subject matter.
Figure 11:
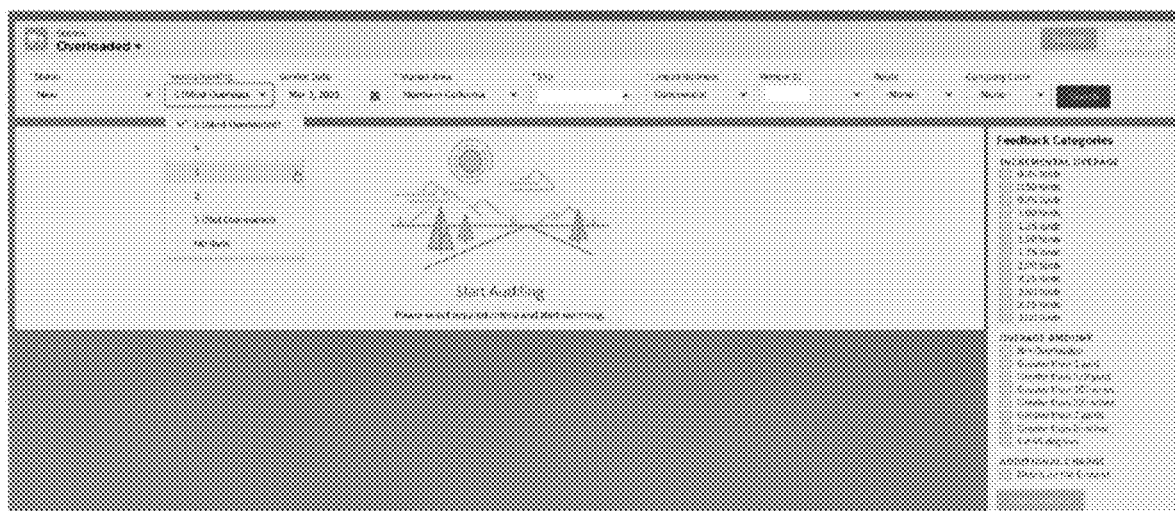
FIG. 11 is an illustration of an auditing portal configured for overloaded analysis (most overloaded) in accordance with an illustrative embodiment of the presently disclosed subject matter.

FIG. 10 shows portal 1000 configured for overloaded analysis. A first search tab or option is the status indicator, which can be a single-select where auditors can search for new or they can review for overloaded or not overloaded events. A service date option or tab allows users to search, for example, periods such as the prior 15 days, or from a specific date. A market area option or tab allows the user to search regions (e.g., Northern California). A site option or tab gives auditors the ability to single or multi-search for a given specific site. A line of business option or tab allows auditors to select between commercial or residential, or other options as available. Options or tabs can also be available for vehicle, route and/or company code. A media ranking option or tab allows the auditor to utilize predictions from machine learning workflows that break the events into different rankings or queues. For example, as shown in the illustrative embodiment of FIG. 11, a ranking of one represents not overloaded and a ranking of five represents the most volume of overloaded material. In certain illustrative embodiments, the queues can work from one to five in the overloaded workflow and one to three in contamination, where a one equates to a non-event, whether it be not overloaded or not contaminated. The remaining queues can equate to varying levels or varying degrees of either overage or contamination.

Figure 12:
FIG. 12 is an illustration of an auditing portal configured for overloaded analysis (most overloaded) in accordance with an illustrative embodiment of the presently disclosed subject matter.

As shown in the illustrative embodiment of FIG. 12, a search can be performed by selecting "overloaded" under the search button and queue 1 (non-overloaded) under media ranking, and the resulting outputs can represent true predictions from the machine learning workflows of where the machine learning has predicted a non-overloaded event. By doing this, an auditor is able to remove multiple items from the review in these nonevent queues by reducing the queue with the highest degree of accuracy, for both the overage and contamination workflows. The resulting display on portal 1000 shows all the events that the machine learning has predicted as not overloaded. The machine learning functionality relies upon more than simply identifying whether or not there is material visible. For example, if there are two bins side by side and one is overloaded, post-processing scripting is used to analyze the images and understand which bin is actually being serviced at that time. The auditors are able to review the various events and provide verification by clicking on a box associated with one or more given events to identify and verify that the events that the machine learning identified as not overloaded were, in fact, not overloaded. Over time, as the auditors are able to more quickly audit and review the queues and become more comfortable with the degree of accuracy of the machine learning, the portal 100 can be adjusted to quickly hide all the events believed to be queue one events for both overloaded and contamination events, so that auditors no longer have to look and review all of these queues.

Figure 13:
FIG. 13 is an illustration of an auditing portal configured for overloaded analysis (most overloaded) in accordance with an illustrative embodiment of the presently disclosed subject matter.
Figure 14:
FIG. 14 is an illustration of an auditing portal configured for overloaded analysis for a specific site/container in accordance with an illustrative embodiment of the presently disclosed subject matter.

As shown in the illustrative embodiment of FIG. 13, a search can be performed by selecting "overages" under the search button and queue 5 (most overloaded) under media ranking, and the resulting outputs can represent true predictions from the machine learning workflows of where the machine learning has predicted a most overloaded event. The auditors can review the images on portal 1000 and provide feedback to, not just the machine learning, but also to help identify any false positives and false negatives. Also, the auditors are able to multi-select and confirm the machine learning findings as well as select one or more feedback categories relevant to overage such as estimate size of overage which will help with not only identifying locations or other identifiers as well as give feedback to improve the machine learning functionality. For example, the auditors can analyze an entire queue (e.g., queue 5) and be able to quickly screen that for possible and false positives or false negatives. In doing so, they can click on a specific event, as shown in the illustrative embodiment of FIG. 14, which would produce a larger "pop-up" image with more details, and then see and determine whether or not they believe the image is representative of an overloaded container. For example, where the machine learning has incorrectly predicted "most overloaded" based upon the presence of snow on the top of the container lid or an out-of-focus image, an auditor would simply deselect this event. The auditors can also provide additional "feedback" such as the amount of incremental overage or estimated overage amount and whether debris is on the ground. Through this process, the auditors can review and correct what is predicted as an overage, and then click the "submit" button to submit the results and help refine and strengthen the machine learning functionality.

Figure 15:
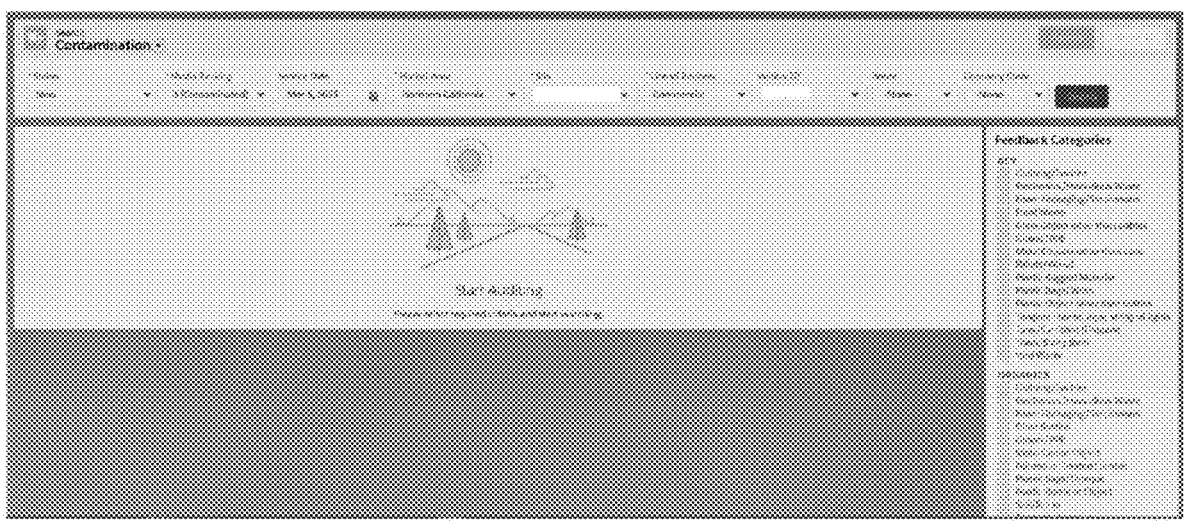
FIG. 15 is an illustration of an auditing portal configured for contamination analysis in accordance with an illustrative embodiment of the presently disclosed subject matter.
Figure 16:
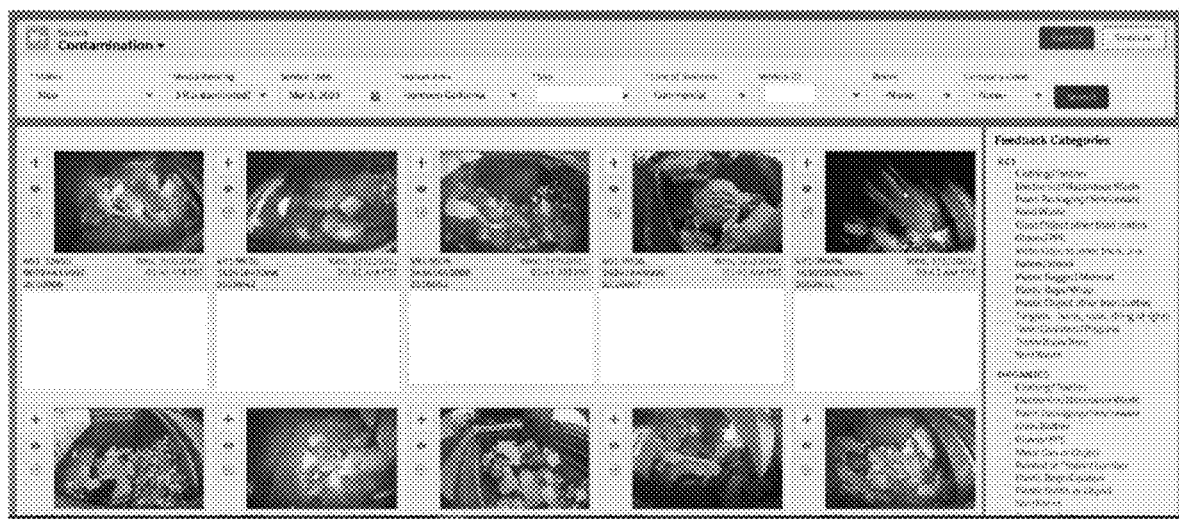
FIG. 16 is an illustration of an auditing portal configured for contamination analysis in accordance with an illustrative embodiment of the presently disclosed subject matter.

As shown in the illustrative embodiment of FIG. 15, a search can be performed by selecting "contamination" under the search button and queue 3 (contaminated) under media ranking, and the resulting outputs, as shown in the illustrative embodiment of FIG. 16, can represent true predictions from the machine learning workflows of where the machine learning has predicted a contaminated event. In certain illustrative embodiments, in order to effectively process the contamination incidents that are displayed on portal 1000, the machine learning is first splitting the videos out into individual frames and then predicting upon those individual frames. Also, the auditors are able to multi-select and confirm the machine learning findings as well as select one or more feedback categories which will help with not only identifying locations or other identifiers such as type of materials as well as give feedback to improve the machine learning functionality.

Figure 17:
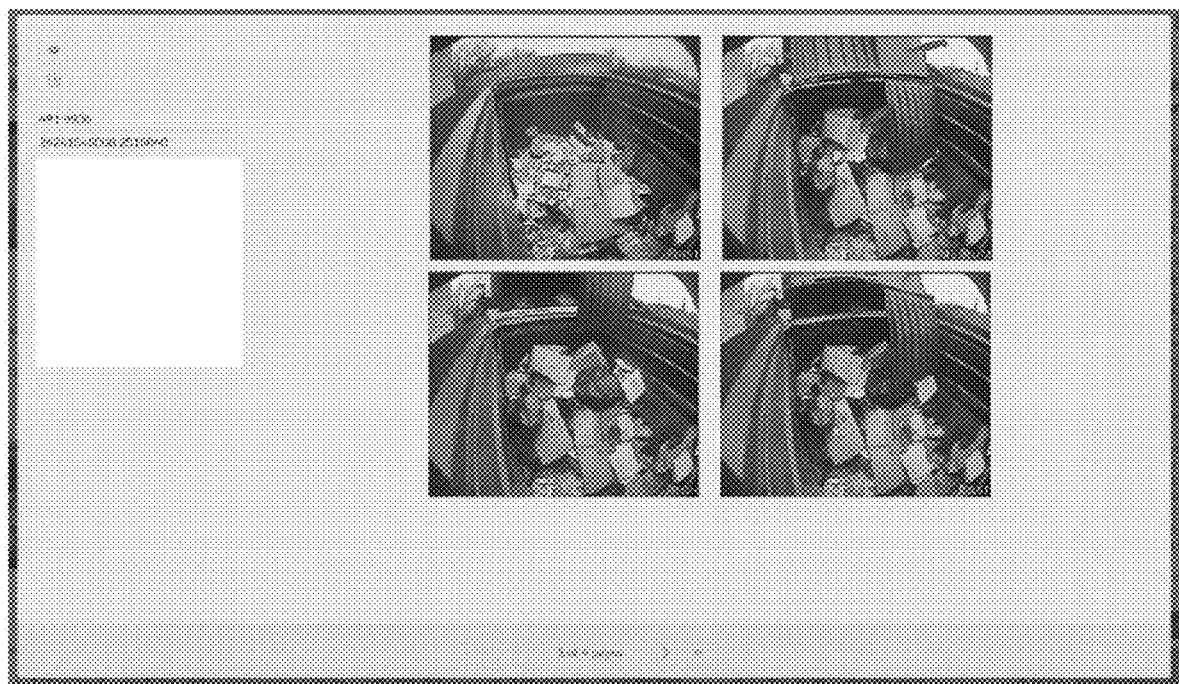
FIG. 17 is an illustration of an auditing portal configured for contamination analysis for a specific site/container in accordance with an illustrative embodiment of the presently disclosed subject matter.

As shown in the illustrative embodiment of FIG. 17, the image can be split into ten relevant frames based upon overall motion detected within the course of the video. That way pre-container disposals are not included as part of the predictions. The pop-up that appears on portal 1000 can include the first-in-time (designated as "first") and the last-in-time (designated as "last") frames to give the auditor a baseline of what is occurring in the video. Also, the highest predicted contamination value (designated as "high") along with the second highest contaminated value (designated as "medium") can be included on the image so that the auditors can quickly digest and understand what might be occurring in a given video. A link to the video can also be provided so that the auditors can review as desired; however, the auditors do not need to watch all the video to make a determination. The system is able to identify the frames where contamination is believed to have occurred and that decreases the time to complete the work and increases efficiency, as opposed to the auditors having to go through all the video processing before identifying whether there is contamination present. As a result, the initial set of images and videos produced via machine learning functionality are reviewed and then selected images displaying overages and contamination are passed along for further processing.

In certain illustrative embodiments, the images and videos of overages and contamination selected above can be further processed and utilized to right size customer offerings. The images and videos can be dispositioned as chargeable or non-chargeable incidents in an automated process so that customers are not mistakenly overcharged, particularly in scenarios where the services provider is required to give one or more warnings to customers before charges for overage or contamination occur. One or more business rules can be configured to facilitate this process based upon criteria such as market area, line of business, event type (overloaded or contamination), company code, and type of waste stream (e.g., MSW organic, recyclable, yard waste, etc). An effective start date and effective end date can be associated with the rule. An event history can show the number of warnings provided to date. If the rule requires two warnings to the customer before charging begins, then the system can be configured such that the third incident and any subsequent incident can be auto set to charge. This represents an incident processing step in an end-to-end flow that can include, in certain illustrative embodiments, the following steps: (i) image capture; (ii) use of machine learning algorithms to determine whether a incident is contaminated or overloaded and provide rankings; (iii) incident review with machine learning rankings available; (iv) use of business rules to determine incident charging decisions; (v) incident processing; and (vi) customer communications.

While illustrative embodiments relating to overages and contamination are specifically provided herein, the presently disclosed subject matter can be incorporated with a non-exhaustive listing of use cases as follows: (a) commercial, residential and industrial waste services for user customer services; (b) overloaded waste containers in all lines of business (commercial, residential and industrial); (c) contamination of source separated containers (e.g., residential green waste, residential single stream, commercial recycling and commercial organics); (d) open lids in all lines of business; (e) container spacing; (f) waste outside the container, bin and roll-off box; (g) proper container and bin placement; (h) prohibited and contaminated waste; (i) damaged containers (e.g. broken lids, broken wheels, sleeve damaged, bottom rusted out, graffiti, needs stickering, missing lids, crack container, leaking container, etc.); (j) service confirmations-driver initiated; (k) hoc or haul or call—: customer accounts, which are unserviceable due to the container or bin being inaccessible, blocked, locked or containing prohibited waste (e.g. contamination, universal waste, electronics, etc.); (l) dangerous stops or hard to service stops; (m) property damage; (n) bulky pick-up; (o) ancillary fee audit with ancillary services defined by user; (p) open market sales opportunities, for example, an incentive based program where end-user drivers identify open market competitor containers within user's service area and captures images from the optical sensors, on board computer and dvr and submits images for sales to call on opportunities to convert to user; (q) competitors poaching or infringing on user's franchise business within franchised municipal services; (r) bin delivery, swaps and removals for new or existing customers; (s) service level audits including container size, number and service frequency; (t) determination of services being provided to non-user customers; (u) franchise requirements (signage, city designations, notices, etc.); (v) proactive customer notifications as defined by user; (w) proactive driver notifications as defined by user; and (x) such other use cases as defined by user. FIG. 18 shows a non-exhaustive listing of use cases that may be incorporated with the presently disclosed system and method.

The presently disclosed subject matter has a variety of practical applications, as well as provides solutions to a number of technological and business problems of the prior art. For example, accuracy in customer billing is improved. A critical component of providing waste services to residential and commercial customers is accuracy in the customer's statement. The presently disclosed system and method allows the waste services provider to determine if the waste container or bin is overloaded and/or contaminated resulting in the customer requiring additional service beyond the capacity of the container or bin. Improved management and education of customers regarding service requirements also occurs. An obligation of the waste service provider is to manage and educate the residential and commercial customer of the waste collection company's service requirements. The system and method of recording and auditing service related and non-service related activities outside of the waste collection vehicle allows the end-user to educate the customer on closing the container or bin lid to reduce capturing of precipitation, to reduce litter/blight, to reduce unauthorized dumping or use, and to reduce animals and vermin from intruding the container or bin, as well as the dangers and hardships associated with overloading a container or bin.

Improvements in employee and public safety also occur. An obligation of the waste service provider is to provide a safe working environment for its employees and its customers. The presently disclosed system and method allows the end-user to: (i) improve safety and protects its employees and equipment by reducing overloaded containers, which damage equipment, cause collection vehicle fires, cause other property damage from falling debris and otherwise puts its employees at risk; (ii) improve safety by identifying and abating dangerous stops and hard to service accounts, which result in vehicle accidents and employee injuries; (iii) improve safety and reduce vehicle accidents by having safe access to containers and bins; and (v) improve safety by identifying and correcting overloaded containers and bins at customer's service location.

Improved customer service can also be provided. The cornerstone of a successful waste collection provider is providing excellent customer service. The system and method disclosed herein allows the end-user to: (i) proactively notify the customer of waste collection service requirements to ensure safe and efficient waste collection; (ii) demonstrate a container is overloaded and/or contaminated or unavailable for service and assist the customer in efforts to receive timely service; (iii) educate the customer on proper recycling and management of waste in each of the containers or bins; and (iv) proactively remove or repair damaged and/or leaking containers and bins.

Operational Improvements can also occur. Operational improvements result in more efficient waste collection services and ultimately improved earnings, safety and employee morale. The system and method disclosed herein allow the end-user to: (i) reduce overloaded and/or contaminated containers resulting in less equipment damage, employee injuries and time off-route; (ii) improved route efficiencies by servicing readily accessible containers and bins; and (iii) supporting frontline employees by holding customer to waste collector's service requirements.

In certain illustrative embodiments, the presently disclosed systems and methods can also be utilized in connection with a centralized platform for remote, real-time customer management of waste/recycling pick-up and collection services. In certain illustrative embodiments, a system for facilitating selection and monitoring of waste/recycling pick-up and collection services by a customer can include a memory, an electronic viewing portal with a display for viewing by a customer, and a processor coupled to the memory programmed with executable instructions. The processor and/or memory can be configured to receive identifying information from a customer via the electronic viewing portal, associate the customer with stored customer information based on the identifying information, determine (using back end functionality) one or more waste/recycling pick-up and collection service options for the customer based on the stored customer information, which can include the use of customer and/or container discovery information based on GPS drive path analysis for a waste/recycling service vehicle as described in the various embodiments herein, display the one or more waste/recycling pick-up and collection service options on the display, receive instructions from the customer regarding which of the waste/recycling pick-up and collection service options to perform, and display the status of the performance of the one or more waste/recycling pick-up and collection service options on the electronic viewing portal for viewing by the customer. The customer facing applications may be present in the form of downloadable applications installable and executable on user devices, e.g., "electronic viewing portals" such as computers, smartphones, or tablets. Additionally (or alternatively), the customer applications may be available as one or more web applications, accessible via a client device having an internet browser. The customer facing applications can utilize customer service digitalization and allow a customer to select and/or monitor waste/recycling pick-up and collection services from the provider on a real-time basis, and the customer offerings can be based, in whole or in part, upon back end functionality that includes the use of customer and/or container discovery information based on GPS drive path analysis for a waste/recycling service vehicle.

The presently disclosed systems and methods can be utilized in connection with a centralized platform for auditing of other use cases besides overages and contamination, such as uses cases involving service confirmations, dangerous stops, driver notifications, customer notifications, container deliver repair or swaps, not-outs, hard to service stops, damaged containers, property damage, parcel data analysis, bulky waste, service level audits and ancillary fee audits, as well as other industries besides waste/recycling pick-up and collection services, such as, for example, package delivery, logistics, transportation, food delivery, ride hailing, couriers, freight transportation, etc.

Those skilled in the art will appreciate that certain portions of the subject matter disclosed herein may be embodied as a method, data processing system, or computer program product. Accordingly, these portions of the subject matter disclosed herein may take the form of an entirely hardware embodiment, an entirely software embodiment, or an embodiment combining software and hardware. Furthermore, portions of the subject matter disclosed herein may be a computer program product on a computer-usable storage medium having computer readable program code on the medium. Any suitable computer readable medium may be utilized including hard disks, CD-ROMs, optical storage devices, or other storage devices. Further, the subject matter described herein may be embodied as systems, methods, devices, or components. Accordingly, embodiments may, for example, take the form of hardware, software or any combination thereof, and/or may exist as part of an overall system architecture within which the software will exist. The present detailed description is, therefore, not intended to be taken in a limiting sense.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. As used herein, the term "A and/or B" means embodiments having element A alone, element B alone, or elements A and B taken together.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

It is to be understood that the present invention is not limited to the embodiment(s) described above and illustrated herein, but encompasses any and all variations falling within the scope of the appended claims.

What is claimed is:

1. A system for right sizing a customer waste container during performance of a waste service activity by a waste services provider, the system comprising:
   an optical sensor disposed on a waste collection vehicle and configured to capture image data of the customer waste container that is indicative of the fill status of the container;
   a memory storage area, and
   a processor in communication with the memory storage area and configured to:
      receive the image data from the optical sensor;
      compare the fill status from the image data of the customer waste container to a predetermined overload threshold condition for an exemplary customer waste container stored in the memory storage area, wherein the processor is trained, using machine learning functionality, to recognize and identify the fill status of the customer waste container based on the image data received from the optical sensor;
      determine, based on the comparison, whether the fill status of the customer waste container has met or exceeded the predetermined overload threshold condition;
      score and rank the results of the comparison;
      display the results on an electronic viewing portal;
      make the electronic viewing portal available for viewing by a user;
      receive instructions from the user regarding whether to deliver a different sized container to a customer, based on a review by the user of the scoring and ranking of the results; and execute a communication to the customer advising of the delivery of the different sized container.

2. The system of claim 1, wherein the processor is further configured to:
receive instructions from the user as to which results from the comparison have been accurately scored and ranked; and
communicate the instructions to the machine learning functionality for training purposes.

3. The system of claim 1, wherein the display of results on the electronic viewing portal includes a link to video of the image data and a plurality of still images from the image data with a designation of which still image displays the most overloaded container.

4. A method of right sizing a customer waste container at a customer location by a waste service provider, the method comprising:
capturing image data of the customer waste container that is indicative of the fill status of the container, wherein the image data is captured using an optical sensor located on a waste collection vehicle;
comparing the fill status from the image data of the customer waste container to a predetermined overload threshold condition for an exemplary customer waste container stored in the memory storage area, wherein the processor is trained, using machine learning, to recognize and identify the fill status of the customer waste container based on the image data received from the optical sensor;
determining, based on the comparison, whether the fill status of the customer waste container has met or exceeded the predetermined overload threshold condition;
scoring and ranking the results of the comparison;
displaying the results on an electronic viewing portal;
making the electronic viewing portal available for viewing by a user;
receiving instructions from the user regarding whether to deliver a different sized container to the customer, based on a review of the scoring and ranking of the results by the user; and
executing a communication to the customer advising of the delivery of the different sized container.

5. The method of claim 4, further comprising:
receiving instructions from the user as to which results from the comparison have been accurately scored and ranked; and
communicating the instructions to the machine learning functionality for training purposes.

6. The method of claim 5, wherein the displaying of results on the electronic viewing portal includes a link to video of the image data and a plurality of still images from the image data with a designation of which still image displays the most overloaded container.

7. The system of claim 1, wherein the customer is a commercial customer.

8. The system of claim 1, wherein the customer is a residential customer.

9. The method of claim 4, wherein the customer is a commercial customer.

10. The method of claim 4, wherein the customer is a residential customer.

* * * * *